US007450821B2

(12) United States Patent
Shiiyama

(10) Patent No.: US 7,450,821 B2
(45) Date of Patent: Nov. 11, 2008

(54) MOVING IMAGE PLAYBACK APPARATUS, MOVING IMAGE PLAYBACK METHOD, AND COMPUTER PROGRAM THEREOF WITH DETERMINING OF FIRST VOICE PERIOD WHICH REPRESENTS A HUMAN UTTERANCE PERIOD AND SECOND VOICE PERIOD OTHER THAN THE FIRST VOICE PERIOD

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/756,777

(22) Filed: Jun. 1, 2007

(65) Prior Publication Data
US 2007/0230899 A1    Oct. 4, 2007

Related U.S. Application Data

(63) Continuation of application No. 10/413,390, filed on Apr. 15, 2003, now Pat. No. 7,286,749.

(30) Foreign Application Priority Data

Apr. 16, 2002  (JP)  ............................. 2002-113624
Apr. 16, 2002  (JP)  ............................. 2002-113625

(51) Int. Cl.
*H04N 5/91*   (2006.01)
*H04N 5/93*   (2006.01)
*H04N 7/00*   (2006.01)

(52) U.S. Cl. ............................. 386/95; 386/54; 386/68; 386/75; 386/96

(58) Field of Classification Search ................... 386/75, 386/68, 54, 95, 96
See application file for complete search history.

(56) References Cited

U.S. PATENT DOCUMENTS 5,583,652 A    12/1996  Ware ........................... 386/75

(Continued)

FOREIGN PATENT DOCUMENTS

JP          06-162620          6/1994

(Continued)

OTHER PUBLICATIONS

Feb. 26, 2007 Japanese Office Action in Japanese Patent Application No. 2002-113625 (with English-language partial translation).

(Continued)

*Primary Examiner*—Thai Tran
*Assistant Examiner*—Daquan Zhao
(74) *Attorney, Agent, or Firm*—Fitzpatrick, Cella, Harper & Scinto

(57) ABSTRACT

In a moving image playback apparatus, periods A which represent human utterance periods, and other periods B are determined on the basis of sub-information contained in moving image data. Based on the moving image data, periods A undergo high-speed moving image playback with playback voice within the speed range from a normal speed to a predetermined speed (e.g., 1.5 to 2 times of the normal speed) at which the user can recognize playback contents, while periods B undergo high-speed moving image playback with at least playback voice in a small tone volume or silent high-speed moving image playback at a speed (e.g., 5 to 10 times of the normal speed) higher than the predetermined speed. During the playback, the moving image playback speeds can be adjusted in accordance with user attribute information registered in a user profile (14).

18 Claims, 22 Drawing Sheets

U.S. PATENT DOCUMENTS

| | | | |
|---|---|---|---|
| 5,809,454 A | 9/1998 | Okada et al. | 704/214 |
| 5,848,239 A | 12/1998 | Ando | 709/203 |
| 6,026,067 A * | 2/2000 | Tanaka | 369/47.18 |
| 6,160,950 A | 12/2000 | Shimazaki et al. | 386/46 |
| 6,324,337 B1 | 11/2001 | Goldwasser | 386/75 |
| 7,136,571 B1 * | 11/2006 | Dagtas | 386/68 |
| 7,286,749 B2 | 10/2007 | Shiiyama | 386/75 |
| 2003/0052910 A1 | 3/2003 | Shiiyama | 345/719 |

FOREIGN PATENT DOCUMENTS

| | | |
|---|---|---|
| JP | 09-214879 | 8/1997 |
| JP | 9-247617 | 9/1997 |
| JP | 10-32776 | 2/1998 |
| JP | 10-143193 | 5/1998 |
| JP | 10-172245 | 6/1998 |
| JP | 10-290430 | 10/1998 |
| JP | 11-120688 | 4/1999 |
| JP | 2000-235639 | 8/2000 |
| JP | 2001-045408 | 2/2001 |
| JP | 2001-195809 | 7/2001 |
| JP | 2001-211428 | 8/2001 |

OTHER PUBLICATIONS

May 25, 2007 Japanese Official Action in Japanese Patent Application No. 2002-113624 (with English-language translation).

Nov. 19, 2007 Japanese Official Action in Japanese Patent Application No. 2007-117564 (with partial translation).

* cited by examiner

FIG. 7

| PROFILE |
|---|
| TARO |
| MELINDA |
| KENTO |
| MARIA |

- NEW REGISTRATION
- CHANGE
- DELETE
- CANCEL

FIG. 8

| IDENTIFICATION NAME | MELINDA |
|---|---|
| AGE | 42 |
| FAVORITE LANGUAGE | J,E |
| DYNAMIC VISUAL ACUITY | GOOD |
| HEARING ACUITY | GOOD |
| UTTERANCE PERIOD SPEED | 1.2 |
| NON-UTTERANCE PERIOD SPEED | 5.0 |
| NON-UTTERANCE PERIOD TONE VOLUME | 0 |

- DEFAULT
- OK
- CANCEL

FIG. 9

| PROFILE |
|---|
| TARO |
| MELINDA |
| KENTO |
| MARIA |

FIG. 10

DO YOU WANT TO STORE CURRENTLY SET PLAYBACK SPEEDS OF HUMAN UTTERANCE PERIOD, AND PERIOD OTHER THAN HUMAN UTTERANCE PERIOD IN YOUR PROFILE?

| YES | NO |

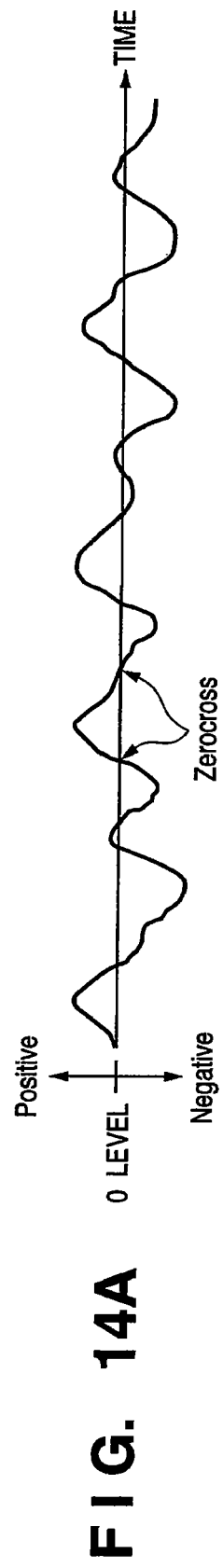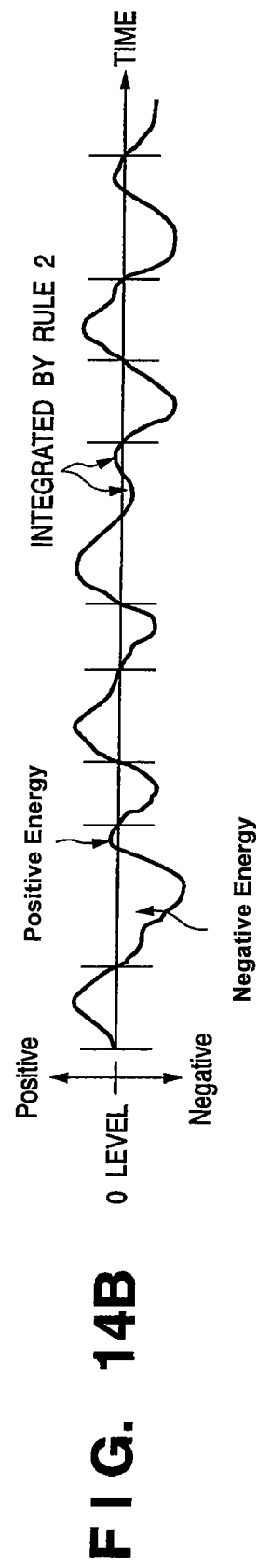
FIG. 14A
FIG. 14B

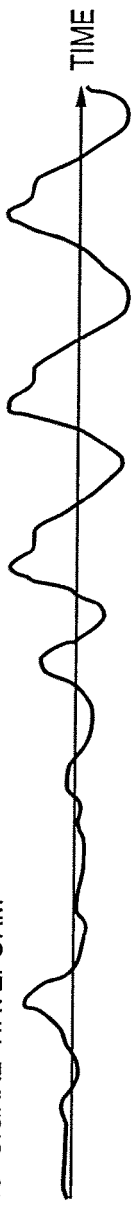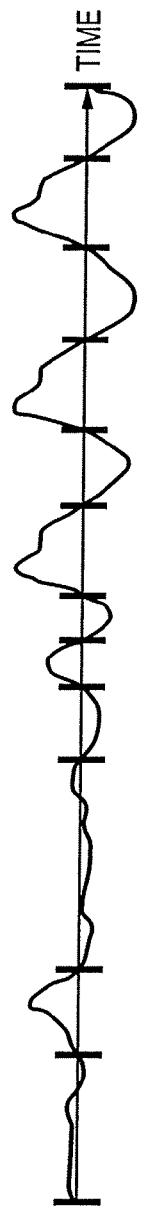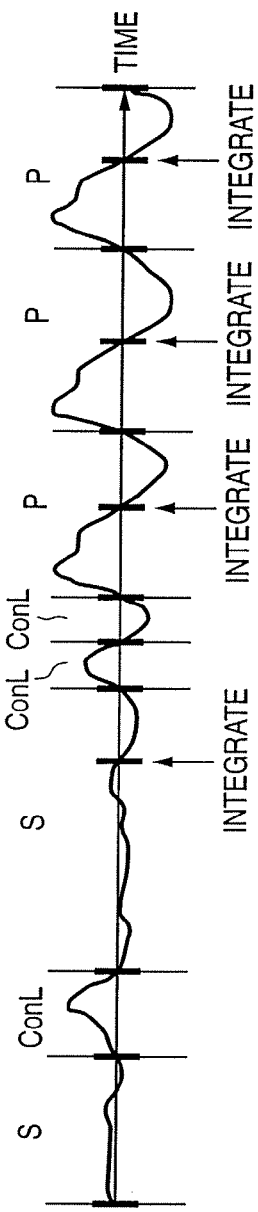

MOVING IMAGE PLAYBACK APPARATUS, MOVING IMAGE PLAYBACK METHOD, AND COMPUTER PROGRAM THEREOF WITH DETERMINING OF FIRST VOICE PERIOD WHICH REPRESENTS A HUMAN UTTERANCE PERIOD AND SECOND VOICE PERIOD OTHER THAN THE FIRST VOICE PERIOD

This is a continuation of application Ser. No. 10/413,390 filed Apr. 15, 2003.

FIELD OF THE INVENTION

The present invention relates to the field of a moving image playback technique that involves audio playback.

BACKGROUND OF THE INVENTION

Conventionally, a moving image playback apparatus such as a video tape recorder or the like, which also plays back audio data, comprises a multiple-speed playback function, quick fastforward function, and the like to allow the user to preview the entire moving image (i.e., the full contents to be played back) within a short period of time upon playback.

For a video tape recorder as a typical moving image playback apparatus, the following technique has been proposed in recent years. That is, upon executing multiple-speed playback of a recording medium, first voice periods in which voice energy is equal to or higher than a predetermined threshold value, and second voice periods in which voice energy is lower than the predetermined threshold value, are detected, and audio signal components in the first voice periods successively undergo pitch conversion and are played back. In this way, the contents of the recording medium can be audibly played back at a double speed, so that the user can understand the contents of playback voice which is slightly in rapid utterance, while deflating the second voice periods.

However, when the audio signal locally undergoes a pitch conversion process, synchronization between voice and video data cannot always be maintained upon moving image playback (moving image quick-preview playback). Hence, since a video image of a person who is speaking in the playback video cannot be synchronized with his or her playback voice, the playback result is unnatural for the human sense, and the user may find it unsatisfactory.

For example, Japanese Patent Laid-Open Nos. 10-32776, 9-214879, and the like have proposed techniques which detect silent states based on voice energy, and recognize voice other than the detected silent states as voice periods uttered by persons so as to summarize a moving image. However, in a moving image such as a news program or the like throughout which voices uttered by persons are dominant, voice periods uttered by persons can be detected to some extent on the basis of voice energy, but this method is infeasible in an environment where background noise or background music is present.

Furthermore, many prior arts that detect voice and play back a moving image in consideration of detected voice have been proposed even before the aforementioned patent publications. Most of these techniques detect voice by executing a threshold value process of voice energy. In the background of these techniques, a problem caused by the ambiguity of the Japanese language is present, i.e., "human voice" such as speech is called "音声 (/onsei/)" in Japanese, and general sounds including human voice are also called "音声(/onsei/)".

Therefore, it is inappropriate to generically name the threshold value processes of sound energy in such prior arts as true "voice detection".

On the other hand, Japanese Patent Laid-Open No. 9-247617 has proposed a technique for detecting "feature points of voice information or the like" by obtaining feature points by computing the FFT (Fast Fourier Transform) spectrum of an audio signal, and analyzing its tone volume. However, with the method using the FFT spectrum, when an audio signal to be played back contains so-called background music or the like, which forms a spectrum distribution over a broad range, it becomes difficult to detect voice uttered by a person from such signal.

In this way, the conventional moving image playback that involves voice suffers a problem that detection of voice periods is too technical and inaccurate, as described above. Furthermore, when a moving image summary is generated or a moving image undergoes multiple-speed playback using the detection result, synchronization between video and audio data cannot be maintained upon playback.

In recent years, media in which information of utterance contents is multiplexed on moving image data and an audio signal or is inserted in another region or band by means of a caption, closed caption, or the like are available. Upon playing back such media, when a moving image summary is to be generated or a moving image undergoes multiple-speed playback using the detection result of voice periods, synchronization between video and audio data cannot be maintained upon playback.

In general, it is not easy for some users such as elderly persons, children, and the like to make full use of various apparatuses. In addition, voice uttered rapidly cannot be well understood by such users. Hence, upon executing quick preview (clipped playback) of contents such as multiple-speed playback in the aforementioned moving image playback apparatus such as a tape recorder or the like, optimal playback conditions for such user are different from those for normal users.

Furthermore, upon executing quick preview (clipped playback) of contents such as multiple-speed playback in the aforementioned moving image playback apparatus, optimal playback conditions for users with poor dynamic visual acuity, users with hearing problems against rapid utterance, non-native foreign users of a language of voice to be played back, and the like are different from those for normal users.

SUMMARY OF THE INVENTION

The present invention has been proposed to solve the conventional problems, and has as its object to provide a moving image playback apparatus, moving image playback method, and computer program thereof, which can accurately detect voice periods uttered by a person, and can greatly shorten a browse time required for the user while faithfully maintaining synchronization between video and audio data in accordance with the detected voice periods.

In order to achieve the above object, a moving image playback apparatus according to the present invention is characterized by the following arrangement.

That is, a moving image playback apparatus which enables to play back moving image information at a high speed, comprises:

voice period determination means for determining a first voice period which represents a human utterance period, and a second voice period other than the first voice period, on the basis of sub-information or an audio signal contained in the moving image information; and quick preview playback means for making high-speed moving image playback with playback voice of the first voice period at a predetermined speed at which a user can recognize playback contents, while making at least high-speed moving image playback of the second voice period at a speed higher than the predetermined speed.

In a preferred embodiment, the quick preview playback means makes moving image playback with at least playback voice in a small tone volume of the second voice period at the speed higher than the predetermined speed.

In a preferred embodiment, the quick preview playback means makes silent moving image playback of the second voice period at the speed higher than the predetermined speed.

Note that the sub-information contains any of start and end timings, a start timing and period duration, and an end timing and period duration of a voice period uttered by a person.

For example, upon reception of an instruction of execution of high-speed moving image playback by the quick preview playback means, the voice period determination means preferably determines the first and second voice periods on the basis of the moving image information prior to output of a playback video, so as to execute determination of voice periods by the voice period determination means and high-speed moving image playback by the quick preview playback means in pseudo real time.

For example, the voice period determination means comprises correction means for making correction by integrating a plurality of neighboring first voice periods on a time axis upon determining the first voice period on the basis of the audio signal. In this case, the correction means preferably detects scene change points contained in the moving image information, and when a time interval (i.e., the distance on the time axis) between a neighboring scene change point, which is earlier than a start point of the first voice period of interest and is closest to the start point, of the detected scene change points, and that start point is not more than a predetermined threshold value, the correction means preferably makes correction by replacing the start point of the first voice period of interest by information corresponding to the neighboring scene change point.

Note that the correction means may acquire the scene change points contained in the moving image information by extracting the scene change points from the sub-information.

Alternatively, the voice period determination means may extract a voice pitch corresponding to a vocal-fold vibration on the basis of the audio signal, and may determine the first voice period on the basis of the extracted voice pitch.

The voice period determination means determines the first voice period by detecting dominant vowel parts of a human voice by extracting a pitch within a possible vocal-fold frequency range from a signal obtained by filtering a band of voice which is contained in the audio signal and is uttered by a person, and integrating the detected vowel parts.

For example, the quick preview playback means calculates a time required for the high-speed moving image playback on the basis of a duration and playback speed of the first voice period, and a duration of the second voice period, and presents the calculated required time to the user.

In this case, the quick preview playback means preferably comprises adjustment means for, when the user changes playback speeds of the first and second voice periods after the required time is presented, adjusting the required time on the basis of the changed playback speeds.

In a preferred embodiment, the apparatus further comprises a user profile which registers attribute information (e.g., age, use language, dynamic visual acuity, and hearing acuity for rapid voice, and the like) associated with each of users who can use the moving image playback apparatus, and the quick preview playback means preferably automatically determines playback speeds of the first and second voice periods in accordance with attribute information associated with a specific user, which is registered in the user profile.

Note that the above object is also achieved by a moving image playback method corresponding to the moving image playback apparatus with the above arrangements.

Furthermore, the above object is also achieved by a program code which makes a computer implement the moving image playback apparatus and method with the above arrangements, and a computer readable storage medium that stores the program code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of a display window for user profile selection;

FIG. 8 shows an example of a display window for user profile registration;

FIG. 9 shows an example of a user profile in the first embodiment;

FIG. 10 shows an example of a display dialog that prompts the user to select whether or not adjusted/changed values are to be used as reference values in the next and subsequent moving image playback operations when the user who is dissatisfied with the presented time required for moving image quick preview playback has changed the setups;

FIGS. 14A and 14B are charts for explaining a coupling process of small segments, which is executed in the second embodiment;

FIGS. 16A to 16C are charts for explaining processes from segmentation until labeling of an audio signal waveform in the second embodiment;

DETAILED DESCRIPTION OF THE PREFERRED EMBODIMENTS

Preferred embodiments of the present invention will now be described in detail in accordance with the accompanying drawings.

First Embodiment

An outline of the operation of a moving image playback apparatus in this embodiment will be explained first with reference to FIG. 1.

Figure 1:
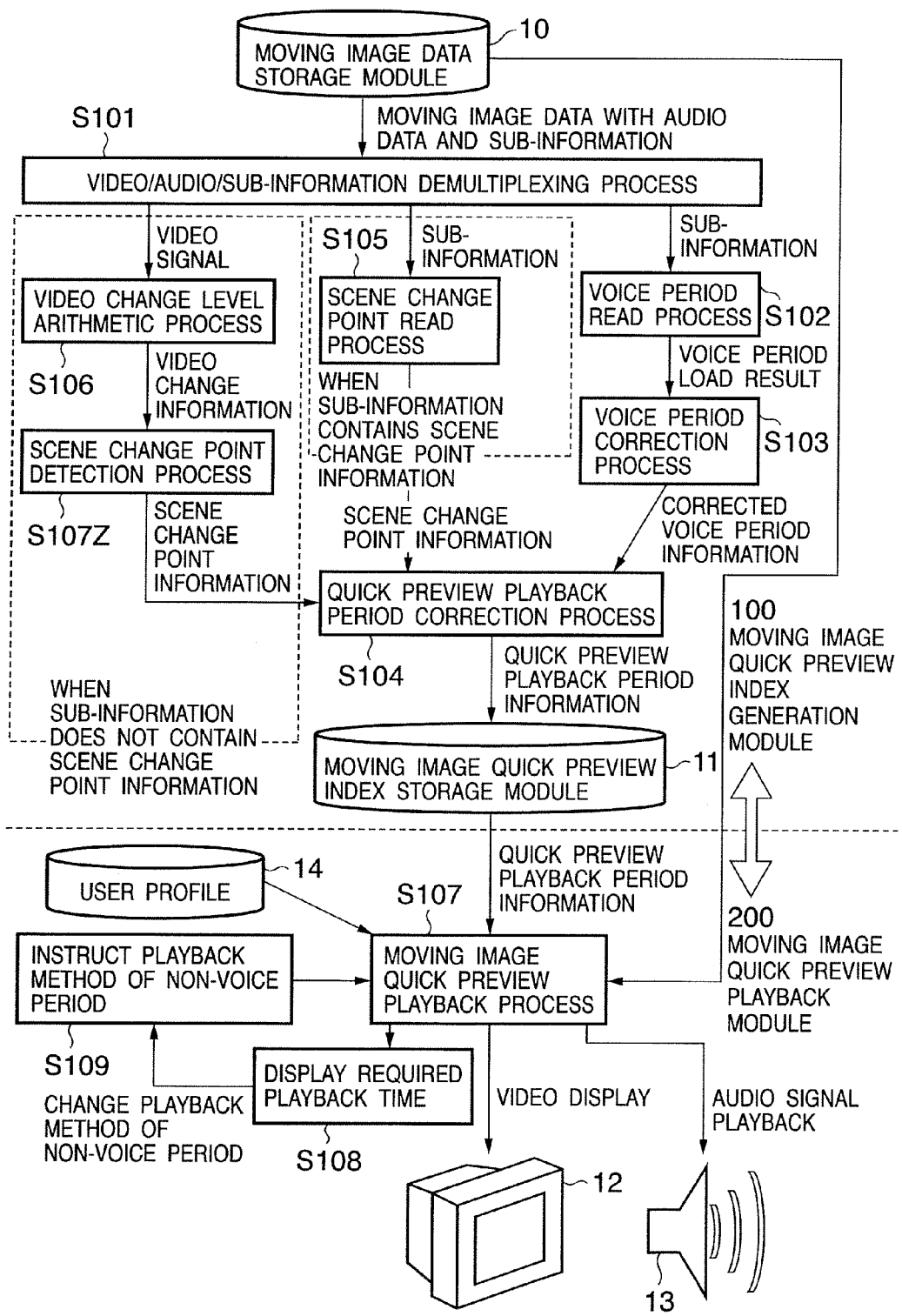
FIG. 1 is a diagram showing an outline of a moving image quick preview algorithm in a moving image playback apparatus according to the first embodiment.

FIG. 1 shows an outline of a moving image quick preview algorithm in a moving image playback apparatus according to the first embodiment.

The moving image playback apparatus according to this embodiment roughly comprises a moving image quick preview index generation module 100 and moving image quick preview playback module 200, as shown in FIG. 1.

Note that a module represents a function unit of a software program executed by hardware of a voice synthesis apparatus according to this embodiment.

<Moving Image Quick Preview Index Generation Module 100>

The moving image quick preview index generation module 100 demultiplexes moving image data read out from a moving image data storage module 10 into video data (video signal), audio data (audio signal), and sub-information in a video/audio/sub-information demultiplexing process (step S101).

The audio signal undergoes a voice period read process (step S102) and voice period correction process (step S103). When the sub-information does not contain any scene change point information, the video signal undergoes a video change level arithmetic process (step S106) and scene change point detection process (step S107Z). When the sub-information contains scene change point information, the video signal undergoes a scene change point read process (step S105). In a quick preview playback period correction process (step S104), quick preview playback period information is generated, and is stored in a moving image quick preview index storage module 11.

That is, in the voice period read process (step S102), "information associated with human utterance contents" and "display timing information" are read out from moving image data as a voice period load result on the basis of information obtained by demultiplexing the moving image data in the video/audio/sub-information demultiplexing process (step S101). Note that the display timing information contains a display start timing, display end timing, and period duration.

In the voice period correction process (step S103), a plurality of neighboring voice periods are integrated to correct a voice period (to be referred to as a "human voice period" or period A hereinafter) which represents a new human utterance period to be played back on the basis of the voice period load result so as not to give umbrage to a person (user), thus acquiring corrected voice period information.

As a bad example upon high-speed moving image playback, when the interval between two neighboring periods A is small, if these voice periods undergo multiple-speed audible playback (e.g., double-speed playback) at a speed which is as low as a person can understand the contents, and periods (to be referred to as periods B hereinafter), which are not human voice periods, are played back at a multiple speed which is too high for a person to recognize the contents of a playback video upon moving image playback, the playback modes change too frequently, and playback voice is offensive to the ears for normal users.

Therefore, in this embodiment, the voice period correction process (step S103) considers the interval between neighboring human voice periods, and when the interval meets a predetermined condition, a plurality of human voice periods are combined, thus eliminating offensiveness to the ears. It is easiest to set, as the predetermined condition, that the interval between neighboring human voice periods is equal to or smaller than a predetermined threshold value.

In the video change level arithmetic process (step S106), video data obtained by the video/audio/sub-information demultiplexing process (step S101) undergoes an inter-frame similarity comparison process described in Japanese Patent Laid-Open No. 2000-235639 to calculate the inter-frame similarity, thus generating video change information.

In general, moving image data containing an audio signal has a video change point, and if a voice period starts immediately after that video change point, a video at the beginning of a scene is played back at high speed in split seconds, and a video image is then played back by multiple-speed audible playback at a speed at which a person can recognize the audio contents. Hence, the user experiences unnatural flickering of video images.

In this embodiment, when the sub-information contains scene change point information, the scene change point read process (step S105) reads out scene change points (scene change point information) from the sub-information. When the sub-information does not contain any scene change point information, the scene change point detection process (step S107Z) detects scene change points (scene change point information) on the basis of video change information obtained by the video change level arithmetic process (step S106) by adopting a scene change point detection technique disclosed in Japanese Patent Laid-Open No. 2000-235639 previously filed by the present applicant.

In the quick preview playback period correction process (step S104), when a given scene change point is earlier than the beginning of a voice period after the voice period correction process in step S103 and is nearest to that period, and the distance between the scene change point and the period is equal to or smaller than a predetermined value, the beginning of the voice period is replaced by information corresponding to a scene change point acquired in step S105 or S107Z, thus removing the user's disrupted feeling.

The processes in the above steps can be done at very high speed. In this embodiment, upon playing back a moving image by the moving image quick preview playback module 200, moving image data, which is read out from the moving data storage module 10 and includes audio data and sub-information, is temporarily stored in a buffer memory (not shown), and the aforementioned "information associated with human utterance contents" is acquired prior to actual moving image playback. Hence, since a quick preview playback period information generation process by the moving image quick preview index generation module 100, and a moving image playback process by the moving image quick preview playback module 200 using the generated quick preview playback period information and moving image data of the entire moving image (i.e., the full contents to be played back) are executed as pseudo real-time processes (i.e., by pseudo parallel processes) without analyzing the contents of moving image data to be played back, the user can efficiently and quickly preview the entire desired moving image contents within a short period of time.

<Moving Image Quick Preview Playback Module 200>

In the moving image quick preview playback module 200, a moving image quick preview playback process (step S107) plays back a playback video using a display 12, and playback voice using a loudspeaker 13. Upon moving image playback by the moving image quick preview playback process, a time required for playback is displayed on the basis of the quick preview playback period information read out from the moving image quick preview index storage module 11 in step S108. Also, feedback of a user required playback condition set in step S109, and a playback condition based on a user profile 14 are systematically judged to set a final quick preview playback condition. Then, moving image data read out from the moving image data storage module 10 is played back on the basis of the set quick preview playback condition.

In this case, in this embodiment,
  periods A undergo multiple-speed audible playback at a speed at which the user can audibly recognize the contents of playback voice, and
  periods B undergo multiple-speed playback at a higher multiple speed within the range in which the user can visually recognize the contents of a playback video.

According to the experimental results of the present applicant, the playback speed of the multiple-speed playback of periods A, i.e., playback at a speed at which a person can audibly recognize contents, is set to be a double speed and, preferably, about 1.5× speed. On the other hand, periods B are played back at a higher multiple speed within the range in which a person can visually recognize the contents of a playback video. According to the experimental results of the present applicant, the playback speed for these periods is set to be a maximum of 10× speed and, preferably, a 5× speed or higher.

Upon playing back periods B at a higher multiple speed, fast spin noise is normally produced. In step S107, if the user does not want to hear such noise upon playing back periods B at high speed, audio playback may be muted to set a silent state or the tone volume upon playback may be reduced.

As the simplest implementation method of the playback speed of periods A, and the playback speed of periods B and the tone volume upon its playback, an audio processing method in the moving image quick preview playback process (step S107) may be determined in advance, or the user may variably set the playback speeds.

However, in general, it is not easy for some users such as elderly persons, children, and the like to make full use of various apparatuses. In addition, the contents of voice played back rapidly cannot be well understood by such users. Hence, it is preferable to easily select multiple-speed playback at a relatively low speed without requiring any troublesome speed adjustment. Likewise, the contents of voice played back rapidly cannot be well understood by users with poor eyesight (vision-impaired persons), users who have weak dynamic visual acuity and hearing acuity (especially, users who have hearing problems against rapid utterance), and non-native foreign users of a language of voice to be played back independently of ages. Hence, optimal playback speeds to such users must be set.

To solve these problems, in this embodiment, information of an age, language, language that the user can understand, visual acuity, hearing acuity, and the like of the user, and attribute information associated with the user such as a reference playback condition that an individual user wants to set, and the like are pre-stored in the user profile 14. The moving image quick preview playback process (step S107) refers to the profile 14 to determine the playback speeds of voice periods (period A) that represent human utterance periods and periods (periods B) except for the human utterance periods in correspondence with a target user, thus allowing moving image quick preview playback, the contents of which can be easily understood by individual users.

As described above, when audio playback is muted or the tone volume is reduced upon higher multiple-speed playback of periods B, such setups may be described in advance in the profile 14, thus allowing comfortable moving image quick preview playback for each user.

Furthermore, as for elderly users and users who are handicapped in dynamic visual acuity, the playback speed of periods A is set to be lower than a normal (1×) playback speed, and that of periods B is set to be higher than the normal (1×) playback speed, although such setups depart from the original purpose of quick preview playback. In this way, such user can browse a moving image (which is a moving image data stored in the moving image data storage module 10) within a shorter period of time than a case wherein all periods are played back at a low speed, while periods A are played back at a low speed at which that user can recognize audio contents.

Also, as for users who are handicapped in understanding of the contents of rapid voice and users who are not good at a language of audio contents, the playback speed of periods A is set to be lower than a normal (1×) playback speed, and that of periods B is set to be a maximum of 10× speed and, preferably, a 5× speed or higher, although such setups depart from the original purpose of quick preview playback. In this way, such user can browse a moving image (moving image data stored in the moving image data storage module 10) within a shorter period of time than a case wherein all periods are played back at a low speed, while period A is played back at a low speed at which that user can recognize audio contents. Whether or not a given user is good at a language of audio contents can be determined by comparing identification information (favorite language in Table 4 to be described later) pre-stored in the profile 14 with language type information of voice contained in a moving image to be played back.

As a sequence for selecting the user profile 14, a user profile list may be displayed on a profile selection window on the display 12, and the user may select a given user profile by operating a remote controller terminal (not shown). Also, an automatic profile selection method using a personal recognition technique by means of fingerprints, voiceprints, facial recognition, or the like may be adopted.

Upon making optimal quick preview playback to each individual user, the duration of an original moving image and its quick preview time are important information for a user who wants to make quick preview in his or her free time.

In this embodiment, in step S108 the total duration of period A is divided by its playback speed to calculate the playback time of period A, and that of period B is divided by its playback speed to calculate the playback time of the period B. Then, the sum of these two calculated times is calculated as a time required for quick preview, and is presented to the user together with a time required to play back an original moving image at a normal (1×) speed. Furthermore, the user can adjust the quick preview time to be closer to his or her desired time by designating the playback speeds of periods A and B after he or she confirms the quick preview time.

As for the relationship between the user profile 14 which is set in advance, and the desired playback speeds designated by the user, when the user who has confirmed the required moving image quick preview time, which was automatically calculated using the profile 14 in step S108, as described above, sets a desired moving image quick preview playback time (playback speed information) by designating the playback speeds of periods A and B in step S109 via a predetermined man-machine interface, the set playback speed information is newly stored in a profile automatically or after user confirmation, so moving image quick preview playback, the contents of which are easy to understand in correspondence with the favor of each individual user can be made while reflecting the previous operation information.

When the processing method of the tone volume upon playback of period B is designated in advance in the user profile or when the user designates such method via a predetermined man-machine interface, moving image quick preview playback, the contents of which are easy to understand in correspondence with the favor of each individual user can be made while reflecting the designated tone volume information.

<Details of Operation of Moving Image Playback Apparatus>

Details of the operation of the moving image playback apparatus according to this embodiment that has been explained briefly will be described below. In the following description, a case will be exemplified wherein quick preview playback period information is generated as index information for quick preview of already recorded moving image data (moving image data containing an audio signal and sub-information) which is stored in the moving image data storage module 10, and quick preview playback of the moving image is made using the generated information.

In this embodiment, post-processes after the video/audio/sub-information demultiplexing process in step S101 are roughly classified into a moving image quick preview index generation process by the moving image quick preview index generation module 100, and a moving image quick preview playback process by the moving image quick preview playback module 200.

Moving image data with audio data and sub-information in this embodiment is contents in which video information, audio information, and sub-information are multiplexed. As media with such information format, for example, DVD, digital television broadcast, and the like are known.

In this embodiment, the sub-information includes various kinds of information different from video information and audio information themselves, such as segment information of a moving image, scene change information, information associated with a caption, time information, and the like.

In the following description of this embodiment, "information associated with human utterance contents" is used as such sub-information. In addition, a caption, closed caption, and the like may be used, and a phonotactic transcription obtained from the recognition result of voice uttered by a person, and the like may be adopted.

Note that a caption or closed caption is overlay-displayed in correspondence with the contents of voice uttered by a person in synchronism with a video signal, so that even a hearing-impaired person or a person who cannot understand a language that he or she is hearing can enjoy the contents. In contents that contain such sub-information, it is a common practice to determine voice periods (periods A) that represent human utterance periods manually, or automatically or semi-automatically prior to provision of the contents, and to describe the human utterance contents in each individual determined voice period as additional information (which corresponds to "sub-information" in this embodiment) of the contents manually and/or by a voice recognition process.

Also, in such contents, it is a common practice to additionally describe a caption or closed caption in a language different from the voice contents uttered by persons, which are unique to the contents, after sub-information described in the contents as described above is translated into a target language by manual or automatic translation.

The sub-information such as a caption, closed caption, or the like normally has period information used to indicate a display period upon moving image playback, and this period information can be considered as a human voice period (period A).

In this embodiment, a human voice period (period A) contained in moving image data with audio data and sub-information which includes that of the above format is detected.

In this embodiment, post-processes after the video/audio/sub-information demultiplexing process in step S101 are roughly classified into a moving image quick preview index generation process by the moving image quick preview index generation module 100, and a moving image quick preview playback process by the moving image quick preview playback module 200, as described above.

<Moving Image Quick Preview Index Generation Module 100>

(Detection of Human Voice Period)

Figure 2:
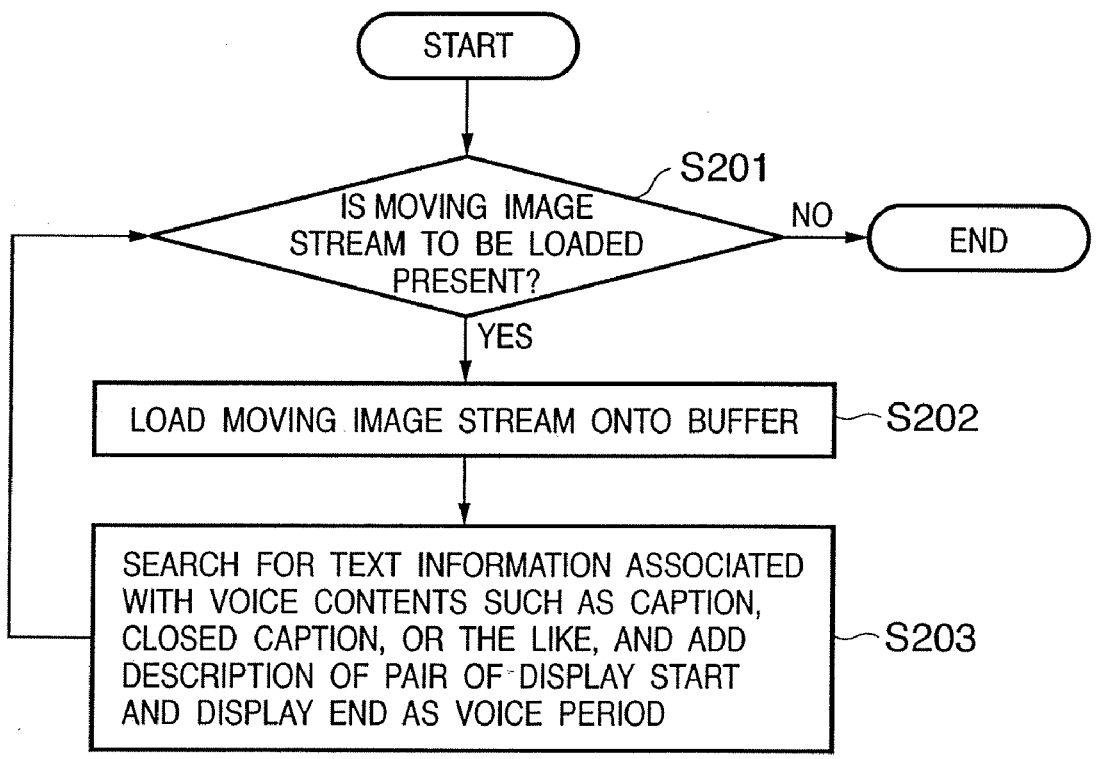
FIG. 2 is a flow chart showing an outline of a human voice period detection process detected by a moving image quick preview index generation module 100 in the first embodiment.

FIG. 2 is a flow chart showing an outline of a human voice period detection process executed by the moving image quick preview index generation module 100, i.e., a detailed sequence of the aforementioned voice period read process (step S102).

Referring to FIG. 2, it is checked in step S201 if moving image streams to be loaded, which have undergone the video/audio/sub-information demultiplexing process in step S101, still remain. If all streams have been loaded, this process ends.

Since it is determined in step S201 that moving image stream to be loaded still remain, one of these moving image stream is loaded onto a buffer (not shown) in step S202. The sub-information contained in the loaded moving stream is searched for a caption, closed caption, phonotactic transcription obtained as a result of voice recognition, or voice detection result information as "information associated human utterance contents", and information obtained as a result of search is set as a human voice period (voice period information) in step S203.

As voice period information to be selected in step S203 from the loaded information, information with higher accuracy of contents may be selected. For example, (information may be selected in the order of caption)>(closed caption)> (phonotactic transcription)>(voice detection result information).

Table 1 exemplifies sub-information loaded as voice period information. In this example, start times (start points) and end times (end points) of individual utterance periods 0 to 2 are loaded as pairs of information.

TABLE 1

| Utterance Period | Start Time [msec] | End Time [msec] |
| --- | --- | --- |
| 0 | 60000 | 80000 |
| 1 | 102000 | 120000 |
| 2 | 400000 | 480000 |

(Correction of Human Voice Period)

Details of the aforementioned voice period correction process (step S103) will be explained below. In step S103, correction is made by integrating a plurality of voice periods which neighbor on the time axis, so as to prevent the user who heard playback voice upon moving image quick preview playback from feeling disrupted.

Note that the voice period information acquired by the aforementioned voice period detection process (FIG. 2) is corrected for the following reason. For example, if the interval between two neighboring periods A on the time axis is small, if multiple-speed audible playback of periods A is made at a speed at which a person can audibly recognize the contents of period A, while multiple-speed playback of periods B is made at a higher multiple speed within the range in which a person can visually recognize the contents of a playback video, the playback modes change too frequently, and playback voice is offensive to the ears of the user.

Also, in terms of a moving image decoder and a playback process, the experiments of the present applicant using DirectShow available from Microsoft demonstrate that changes in speed at short intervals impose heavy overhead on processes, and a playback operation is paused, resulting in non-smooth playback. Also, similar phenomena are observed in many other moving image playback means.

In this embodiment, when the interval between two voice periods (periods A) which are closest on the time axis is equal to or smaller than a given threshold value (Th3 in FIG. 3), correction is made by integrating these voice periods. Upon determination of this threshold value, for example, a scene of a conversation is assumed, and an interval that allows the conversation is experimentally obtained and is used as the threshold value. The processing sequence in this case will be explained below with reference to FIG. 3.

Figure 3:
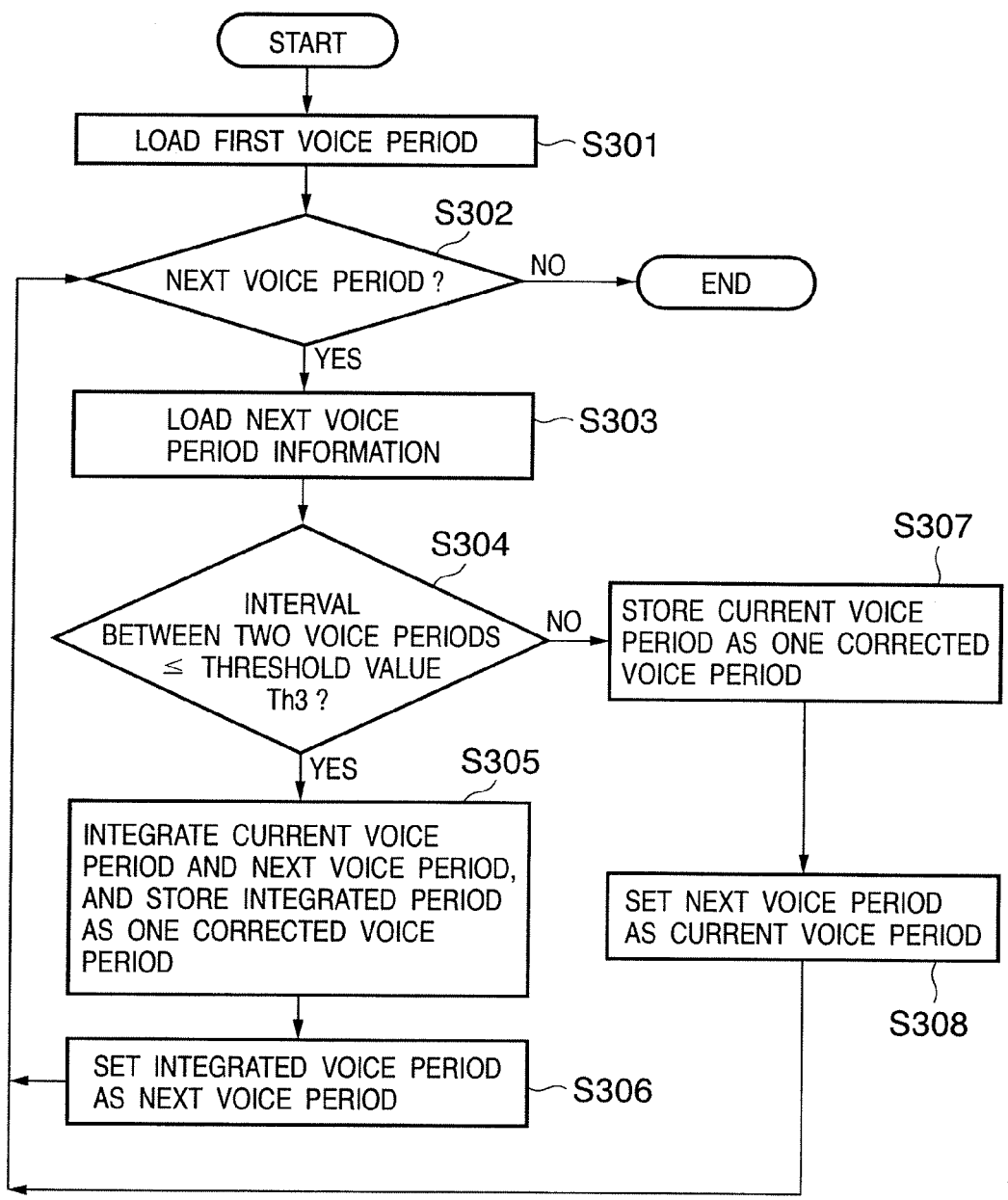
FIG. 3 is a flow chart showing an integration correction process executed for voice periods with short intervals in the first embodiment.

FIG. 3 is a flow chart showing an integration correction process executed for voice periods with a short interval in the first embodiment.

Referring to FIG. 3, period A which is located first on the time axis of a plurality of periods A detected previously is loaded as a voice period of interest in step S301. If there is no voice period of interest, this process ends.

It is checked in step S302 if the next voice period (period A) of interest is present. If no voice period of interest is present, this process ends; otherwise, processes in steps S303 to S307 to be described below are repeated.

Since it is determined in step S302 that the next voice period of interest is present, voice period information which represents that voice period (period A) is loaded in step S303. Note that the voice period information includes a pair of start and end points of the voice period.

In step S304, the interval between two periods A, i.e., the distance between the end point of the first voice period on the time axis (the current voice period of interest) and the start point of the next voice period is calculated, and it is checked if this distance is equal to or smaller than a predetermined threshold value Th3.

Since it is determined in step S304 that the interval between two periods A is equal to or smaller than the predetermined threshold value Th3, these two voice periods are integrated into one voice period in step S305. More specifically, in voice period information of the integrated voice period, the start point of the first voice period, and the end point of the next voice period are set by the process of this step.

In step S306, the integrated voice period is set as a current voice period (period A) of interest, and the flow returns to step S302.

Since it is determined in step S304 that the interval between two periods A is larger than the predetermined threshold value Th3, the current voice period of interest is stored as one corrected voice period information in step S307. In step S308, the next voice period is set as a voice period of interest as an object to be processed, and the flow returns to step S302.

Such integration process is repeated until all voice periods (periods A) are processed.

(Correction of Human Voice Period Using Scene Change Point Information)

In general, moving image data containing an audio signal has a video change point, and if period A starts immediately after that video change point, a video at the beginning of a scene is played back at high speed in split seconds, and a video image is then played back by multiple-speed audible playback at a speed at which a person can recognize the audio contents. Hence, the user experiences unnatural flickering of video images.

To solve this problem, in this embodiment, by adopting, e.g., a scene change point detection technique disclosed in Japanese Patent Laid-Open No. 2000-235639, when scene change points detected in step S107Z or scene change points read out from the sub-information in step S105 include a scene change point, which is earlier than the beginning of a given voice period after the voice period correction process, is closest to that period, and has a distance from that period which is equal to or smaller than a given threshold value, correction is made by replacing the beginning of that voice period by information corresponding to the scene change point, thus removing the user's disrupted feeling upon quick preview playback. In this case, the threshold value for neighborhood determination assumes a value according to overhead upon shifting from high-speed playback to multiple-speed audible playback at a speed at which a person can audibly recognize contents.

Figure 4:
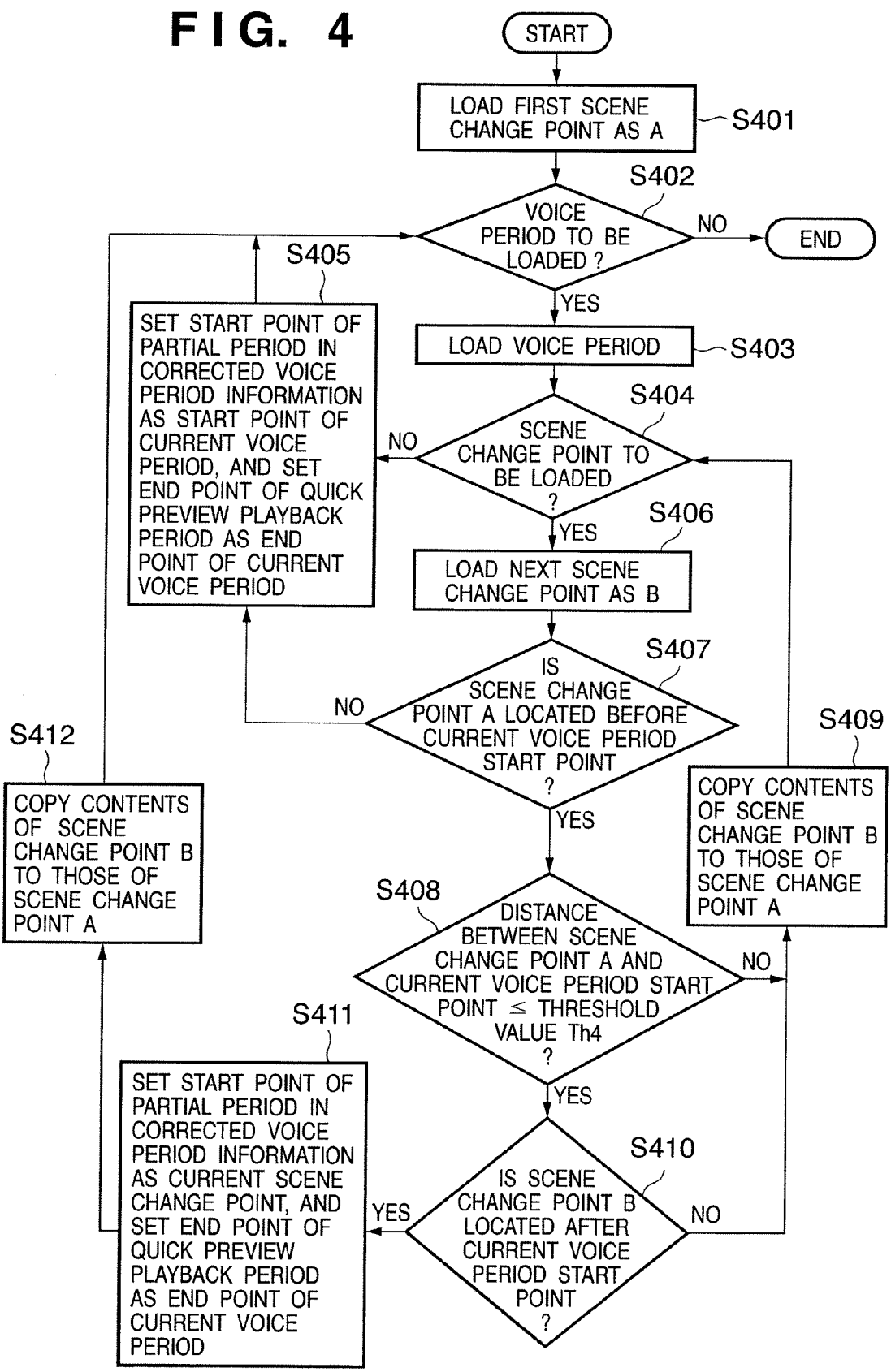
FIG. 4 is a flow chart showing a voice period integration correction process executed using a scene change point in the first embodiment.

FIG. 4 is a flow chart showing a voice period integration correction process using a scene change point in the first embodiment, i.e., details of the quick preview playback period correction process (step S104).

Referring to FIG. 4, a first scene change point (A) on the time axis is loaded from scene change points (scene change point information or scene change position information) detected in the scene change point detection process (step S107Z) in step S401.

Scene change point information is normally described for each frame. However, in this step, the scene change point information is converted into time information based on a frame rate, and that time information is compared with voice period information. That is, in the algorithm of this embodiment, two pieces of successive scene change point information are used to obtain a scene change point which is closest to the start point of a given voice period. Assume that A represents the first scene change point, and B represents the next scene change point for the sake of simplicity. In step S401, the time of a scene change point is stored in A.

It is checked in step S402 if voice period information to be loaded still remains. If all pieces of voice period information have been loaded, this process ends; otherwise, one voice period information is loaded in step S403.

It is checked in step S404 if scene change point information to be loaded still remains. If all pieces of scene change point information have been loaded, the voice period information that has already been loaded in step S403 is stored as corrected voice period information to update old information in step S405.

Since it is determined in step S404 that scene change point information to be loaded still remains, that scene change point information is loaded as scene change point information B in step S406.

It is checked in step S407 if scene change point A is located before the start point of the current voice period of interest loaded in step S403 on the time axis. If scene change point A is not located before the start point, it is determined that no correction is required, and the voice period information is directly stored as corrected voice period information to update old information in step S405.

Since it is determined in step S407 that scene change point A is located before the start point of the current voice period of interest, it is checked in step S408 if the distance between scene change point A and the start point of the voice period is equal to or smaller than a threshold value Th4. If the distance is larger than the threshold value Th4, information of scene change point B is copied to scene change point A in step S409 to prepare for the next scene change point to be checked.

Since it is determined in step S408 that the distance between scene change point A and the start point of the voice period is equal to or smaller than the threshold value Th4, it is checked in step S410 if scene change point B is located after the start point of the voice period. If scene change point B is not located after the start point, the flow advances to step S409.

On the other hand, if it is determined in step S410 that scene change point B is located after the start point of the voice period, a partial period which has scene change point A as a start point, and the end point of the voice period as an end point is stored as corrected voice period information to update old information in step S411. In step S412, information of scene change point B is copied to scene change point A to prepare for the next scene change point to be checked.

That is, only when it is determined in steps S407, S408, and S410 that scene change point A is located before the start point of the current voice period of interest, and neighbors that start point (with the distance equal to or smaller than the threshold value Th4), i.e., is closest to the start point of the voice period, the processes in steps S411 and S412 are executed.

If it is determined in step S410 that scene change point B is not located after the start point of the voice period, it is determined that scene change point B is more suitable as a start point candidate of the corrected voice period than the currently set scene change point A. Hence, information of scene change point B is copied as new scene change point A to prepare for the next scene change point to be checked in step S409. After that, the flow returns to step S404. However, since scene change point A in this case already meets requirements in steps S407 and S408, step S410 may be directly executed while skipping steps S407 and S408.

The corrected voice period information acquired by the sequence of the aforementioned voice period integration correction process (FIG. 4) is stored in the moving image quick preview index storage module 11 in a schema exemplified in Table 2 as quick preview playback period information.

Table 2 exemplifies scene change detection results in this embodiment. For example, this table stores results obtained by converting frames that have change point detection into seconds on frame rate (30 frames/sec).

TABLE 2

| Scene Change ID | Start Time [msec] |
| --- | --- |
| 0 | 50000 |
| 1 | 70000 |
| 2 | 100000 |
| 3 | 101000 |
| 4 | 150000 |
| 5 | 300000 |
| 6 | 500000 |

Table 3 exemplifies corrected voice period detection results in this embodiment, i.e., processing results when the voice period integration correction process (FIG. 4) is executed to have the threshold value Th4=2000 msec on the basis of the results shown in Tables 2 and 1.

TABLE 3

| Utterance Period | Start Time [msec] | End Time [msec] |
| --- | --- | --- |
| 0 | 60000 | 80000 |
| 1 | 100666 | 120000 |
| 2 | 400000 | 480000 |

With reference to Tables 1 and 2, there is no scene change within the period of 2000 msec as the threshold value Th4 before the start points (60000 msec and 400000 msec) of voice periods 0 and 2. For voice period 1, there are two scene change points with scene change IDs=2 (start point 100000 msec) and 3 (start time 101000 msec) 1500 msec before its start point (102000 msec) and within the range of 2000 msec. In this case, since a scene change point closest to voice period 1 is selected according to the algorithm shown in FIG. 4, a scene change point with scene change ID=3 (101000 msec) is consequently selected, and is reflected in Table 3.

<Moving Image Quick Preview Playback Module 200>

The moving image quick preview playback process (step S107) executed by the moving image quick preview playback module 200 plays back human voice periods (periods A) at a multiple speed at which a person can audibly recognize contents, and plays back periods (periods B) which are not human voice periods at a higher multiple speed within the range in which a person can visually recognize the contents of a playback video.

In recent years, a moving image playback environment has been put into place and, for example, when a DirectShow module available from Microsoft is used, seamless playback can be made by designating the speeds of arbitrary periods. Using the module with such function, the playback speed of an arbitrary period can be relatively easily changed. In this case, it is important to determine a standpoint upon changing the speed.

Figure 5:
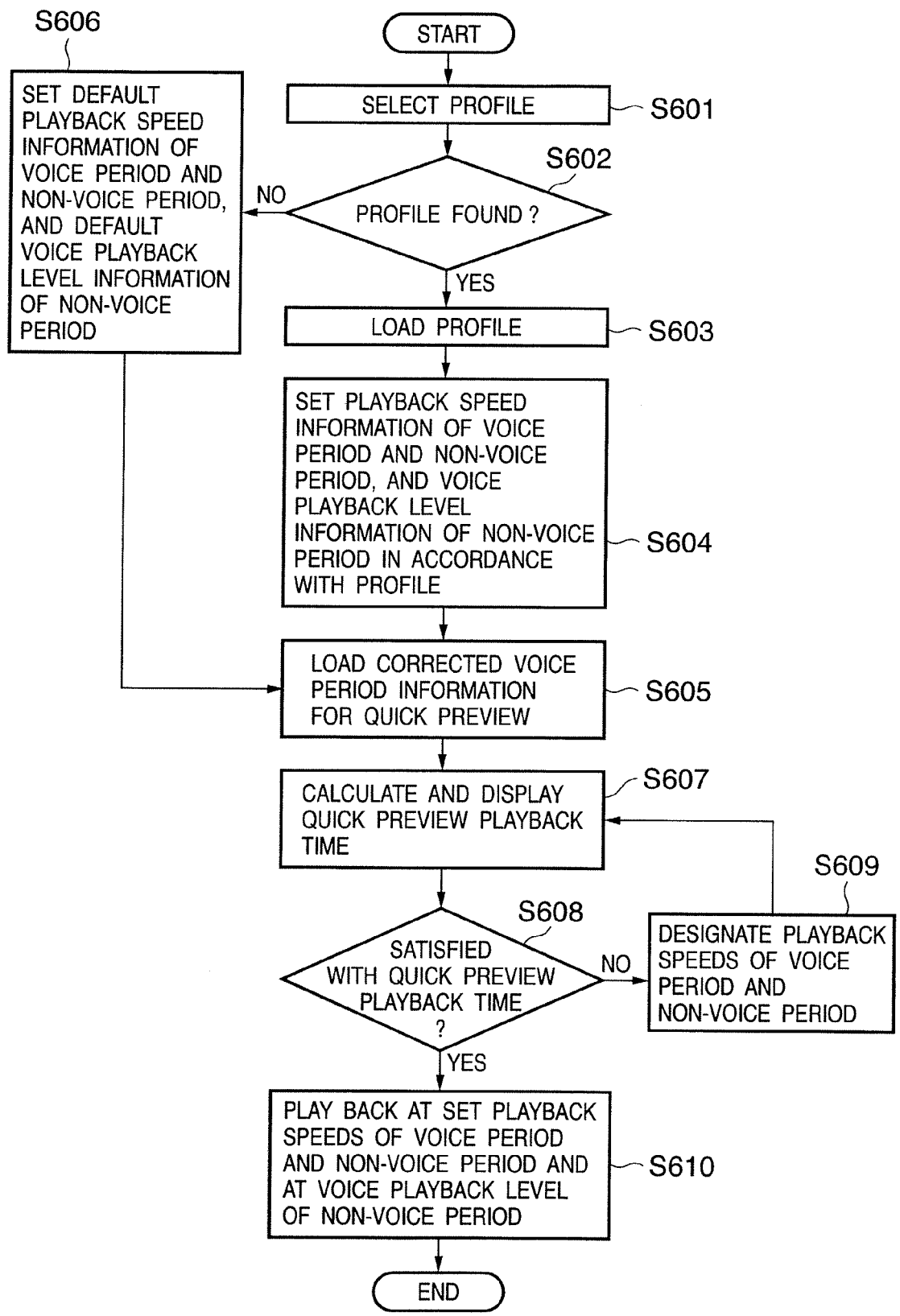
FIG. 5 is a flow chart showing a moving image quick preview playback process in the first embodiment.

FIG. 5 is a flow chart showing the moving image quick preview playback process in the first embodiment.

Referring to FIG. 5, the user selects a desired one from the aforementioned user profile 14 in step S601. As an example of that sequence, a user profile list shown in, e.g., FIG. 7 may be displayed on a profile selection window on the display 12, and the user may select a desired profile by operating a remote controller terminal or the like.

That is, the user designates a desired profile from the user profile list shown in FIG. 7 as follows. That is, a profile select button is provided to the remote controller terminal, and when the user presses this button, a menu display window shown in FIG. 9 is displayed. The user designates a desired profile using the profile select button on the remote controller terminal while watching that window. Of course, an automatic profile selection method using a personal recognition technique by means of fingerprints, voiceprints, facial recognition, or the like is available. With this method, a correct profile can always be designated. Hence, troubles (e.g., a user may designate a wrong profile, or may alter or peek at a profile of another user) can be prevented.

When the user registers a new user profile, he or she designates a "new registration" button on the display window of FIG. 7 using a pointer device. Then, a display window used to prompt the user to input a profile name and other attributes, as shown in, e.g., FIG. 8, appears.

That is, FIG. 8 shows an example of the display window for user profile registration. In an initial state, fields other than those for an identification name and age have default values. The user inputs a unique identification name and age, and changes only the entries of fields that must be changed. After it is checked if input values appropriately fall within predetermined ranges, the user presses an "OK" button to newly add and register that profile to the user profile 14.

When the user wants to change the contents of a desired profile, he or she presses a "change" button on the display window shown in FIG. 7, and then selects a desired profile on the display window shown in FIG. 9. Upon selection of the profile, the display window in FIG. 8 is displayed, and the user changes the information contents in fields that he or she wants to change. After that, the user presses the "OK" button.

Furthermore, when the user wants to delete a desired profile, he or she presses a "delete" button on the display window shown in FIG. 7, selects a desired profile on the display window shown in FIG. 9, and then presses the "OK" button.

When the user presses a "cancel" button on the display windows shown in FIGS. 7 and 8, processes (to register, change, or delete a profile) corresponding to selection and input operations made so far are canceled, and the process ends.

It is checked in step S602 if the profile selected in step S601 is stored in the user profile 14. If that profile is stored, it is read out from the user profile 14 in step S603; otherwise, the playback speeds of periods A and B, and the tone volume upon playing back periods B, which are set as default values, are loaded in step S606. Table 4 shows an example of a data schema of the user profile.

TABLE 4

| Profile ID | Identification Name | Age | Favorite Language | Visual Acuity | Hearing Acuity | Utterance Period Speed | Non-utterance Period Speed | Non-utterance Period Tone Volume |
|---|---|---|---|---|---|---|---|---|
| 0 | default | None | J | Good | Good | 1.5 | 10.0 | 0 |
| 1 | Taro | 45 | J | Good | Poor | None | None | 0.5 |
| 2 | Melinda | 42 | J, E | Good | Good | 1.2 | 5.0 | 0.5 |
| 3 | Kento | 15 | J | Poor | Good | None | None | 1.0 |
| 4 | Maria | 2 | J | Good | Good | None | None | 1.0 |

Table 4 is a table that exemplifies user profiles in this embodiment. Default values can be stored, as indicated by respective entries of profile ID=0. In this case, the playback speed of periods A is 1.5× speed, that of periods B is 10.0× speed, and the default value of the tone volume upon playing back periods B is 0 (i.e., audio mute). These default values are used upon registering a new user profile.

In the data schema of the user profiles in Table 4, "None" indicates no entry. If a value is set, playback is made while giving top priority to that value. Furthermore, in Table 4, "Good" and "Poor" in the fields of visual acuity and hearing acuity represent dynamic visual acuity and hearing ability for rapid utterance independently of the age of that user.

In general, as people get older, their hearing suffers and they become obtuse in understanding words. On the other hand, children cannot often understand voice in rapid utterance since their language ability is underdeveloped.

Under such circumstances, a template of the playback speeds of periods A and B suited to ages of healthy persons is prepared in advance, and these speeds are determined based on the age stored in the user profile 14.

However, there are some factors independent of ages. For example, a person may have poor dynamic visual acuity or may have hearing problems against rapid utterance although he or she is young. Also, a foreigner cannot understand well a voice in his or her non-native language (e.g., Japanese) played back at a high speed. Hence, in this embodiment, the characteristics of the visual acuity and hearing acuity are described as in the user profile exemplified in Table 4, and if these fields have entries, relatively lower playback speeds of periods A and B are set by preferentially using these entries.

In such case, as for elderly users and users who are weak in dynamic visual acuity, the playback speed of periods A is set to be lower than a normal (1×) speed, and that of periods B is set to be higher than the normal (1×) speed, although such setups depart from the original purpose of quick preview playback. In this way, such user can browse a moving image within a shorter period of time than a case wherein all periods are played back at a low speed, while periods A are played back at a low speed at which that user can recognize audio contents.

Also, as for users who have hearing problems against voice in rapid utterance and foreign users who cannot well understand voice in Japanese or the like in rapid utterance, the playback speed of periods A is determined to be a speed lower than the normal (1×) speed, and that of periods B is determined to be the normal speed which is the same as that for healthy users of that age. Hence, such user can browse a moving image within a shorter period of time than in a case all periods are played back at a lower speed, while periods A are played back at a low speed at which that user can recognize audio contents.

In this embodiment, the speed determination process for a user profile makes a comprehensive judgment in consideration of the template of the playback speeds of periods A and B suited to ages of healthy persons, symptoms of poor dynamic visual acuity and poor hearing against rapid utterance, and a situation that a foreigner cannot well understand Japanese in rapid utterance.

In this embodiment, whether or not a given user is good at a language of audio contents is determined by comparing language type information which is stored in the user profile 14 and specifies a favorite or native language, and that of audio contents, which is contained in a moving image to be played back. In recent years, digital contents such as DVDs and the like, and digital media such as digital BS and the like store language type information that specifies a language of audio contents. Also, in recent years, program contents can be digitally acquired from an EPG (Electronic Program Guide), and it is practical to use such information. Even when such information is not available, a default language of even a ground wave TV program is a native language. Also, main audio of bilingual broadcast is normally a native language, and sub audio is a foreign one. Hence, a language can be estimated based on such empirical rules.

In step S604, the playback speeds of periods A and B are determined on the basis of the desired profile of the user's choice loaded in step S603. Details of the process in this step will be explained with reference to FIG. 6.

Figure 6:
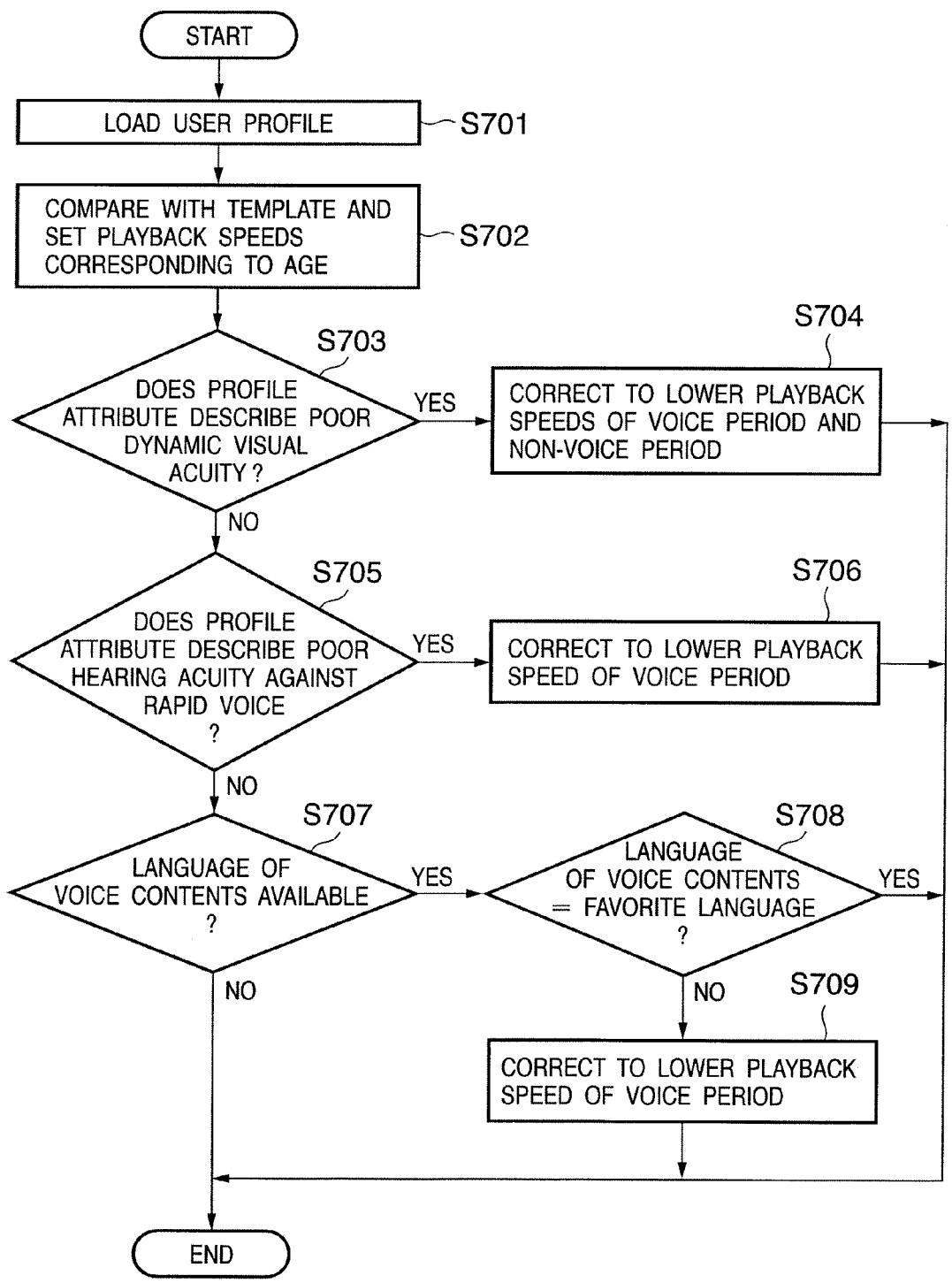
FIG. 6 is a flow chart showing details of the process in step S604 (FIG. 5) of the flow chart showing the moving image quick preview playback process in the first embodiment.

FIG. 6 is a flow chart showing details of the process in step S604 (FIG. 5) of the flow chart showing the moving image quick preview playback process in the first embodiment.

Referring to FIG. 6, a profile previously selected by the user is loaded from the user profile 14 in step S701, and the playback speeds of periods A and B for that user are temporarily determined with reference to the template in which optimal playback speeds of periods A and B to ages of healthy persons are set in accordance with the age of the user acquired from the loaded profile in step S702.

It is checked in step S703 if the profile loaded in step S701 describes that the user has poor dynamic visual acuity. If such description is found, both the playback speeds of periods A and B are updated to values lower than default values in step S704. Therefore, these values are preferably pre-stored in the profile.

Since it is determined in step S703 that the profile does not describe that the user has poor dynamic visual acuity, it is checked in step S705 if that profile describes that the user has hearing problems against rapid utterance. If such description is found, only the playback speed of period A is updated to a lower value in step S706. Hence, this value is preferably pre-stored in the profile.

Since it is determined in step S705 that the profile does not describe that the user has hearing problems against rapid utterance, it is checked in step S707 if language type information of audio contents contained in moving image data to be played back is available. If the language type information is available, the flow advances to step S708; otherwise, the process ends.

In step S708, the language type information of audio contents contained in moving image data to be played back is acquired, and is compared with favorite language information described in the currently selected profile. If these two pieces of information match, the process ends; otherwise, only the playback speed of period A is updated to a lower value. Hence, this value is preferably pre-stored in the profile.

That is, in the series of processes shown in FIG. 6, if NO is determined in all of steps S703, S705, and S708, the playback speeds of periods A and B, which are temporarily determined in step S702, are adopted intact.

If a given user has good dynamic visual acuity or good hearing acuity against rapid utterance independently of his or her age or if a user is poor in such ability for his or her age, it is preferable to be able to change the values of the playback speeds of periods A and B using a change menu of these playback speeds. In this case, the user changes the playback speeds of periods A and B as needed while observing a playback video, and the set playback speed information is stored in the profile corresponding to that user automatically or after user confirmation. In this way, moving image quick preview playback, the contents of which are easy to understand in correspondence with each individual user can be made while reflecting the previous operation information.

When the aforementioned setup process is done by a simple method without using the profile, an embodiment in which the user can variably set the playback speed of periods A within the range from 0.5× speed to 2× speed, and that of periods B within the range from 2× speed to 10× speed using an operation is assumed in place of the processes in steps S601 to S604 and step S606.

Upon playing back periods B at a higher multiple speed, fast spin noise is normally produced. If the user does not want to hear such noise, an embodiment in which audio playback is muted to set a silent state or the tone volume is reduced is assumed. Such setup is also described in advance in the profile loaded in step S603. In moving image quick preview playback, the profile has top priority, and if it is determined in step S602 that no profile is found, a default tone volume, which is set in advance, is adopted in step S606. Of course, if a simpler method is to be used, for example, an embodiment in which a processing method of the audio playback level of periods B in the moving image quick preview playback process is determined in advance is assumed.

With the above arrangement, according to this embodiment, one or both of the playback speeds of periods A and B, and the audio level of periods B can be designated using the user profile, thus easily implementing optimal playback to each individual user.

In step S605, the corrected voice period information is loaded from the moving image quick preview index storage module 11. In step S607, the total duration of periods A is divided by the playback speed to calculate a playback time of periods A. Also, a playback time of periods B is similarly calculated. These two times are added to calculate a required quick preview time for the user. The calculated required quick preview time is presented to the user using the display 12 or the like.

Whether or hot the user who confirmed the quick preview playback time in step S607 is satisfied with that time is determined in step S608 using input operations or the like at a remote controller terminal. If it is determined that the user is satisfied with the time, a moving image to be played back, which is stored in the moving image data storage module 10, is played back in accordance with the playback speeds of periods A and B, and the audio playback level of periods B, which are set by the aforementioned processes, in step S610.

Since it is determined in step S608 that the user is dissatisfied with the time, a man-machine interface that allows the user to change the playback speeds of periods A and B, and the audio playback level of periods B so that the playback time can become equal to or shorter than the user desired playback time is provided in step S609. The user himself or herself, who is dissatisfied with the profile or default setups, adjusts these parameters, so that the playback time becomes close to the desired one. After that, the flow returns to step S607.

As another embodiment corresponding to step S609, the following arrangement is assumed. That is, the user is allowed to change the playback speeds of periods A and B while observing a moving image played back based on the current setups, and the required quick preview time is calculated and presented in correspondence with the changed speeds. In this way, the user himself or herself, who is dissatisfied with the profile or default setups, adjusts these parameters, so that the playback time becomes close to the desired one.

As for the relationship between the user profile, and the desired speeds designated by the user, when the user who has confirmed the required moving image quick preview time in step S607, adjusts or changes the playback speeds of periods A and B using a man-machine interface which allows the user to change these speeds, he or she often wants to adopt the adjusted/changed values as default values. In such case, the playback speed information that has been adjusted/changed by the user is stored in the profile corresponding to the user automatically or after a confirmation dialog shown in, e.g., FIG. 10, is displayed to prompt the user to confirm, and the user selects "YES". As a result, in the subsequent moving image playback processes, moving image quick preview playback, which is easy to understand in correspondence with the user, can be made while reflecting previous operation information.

In the arrangement of the above embodiment, after the user has confirmed the calculated required quick preview playback time, if he or she is dissatisfied with the profile or default setups, he or she changes or adjusts the playback speeds of periods A and B so that the playback time can be equal to or shorter than his or her desired playback time. However, the present invention is not limited to such specific arrangement. For example, the user may be allowed to change the playback times of periods A and B respectively, while observing a playback video, and the required quick preview time corresponding to the changed setups may be re-calculated and may be presented to the user. In this way, the user may adjust the above parameters, so that the playback time becomes close to his or her desired time.

In this embodiment, the voice period information is described as a pair of start and end points. Alternatively, the voice period information may contain a start point and its period duration, or an end point and its period duration.

As described above, according to this embodiment, all periods that include voice uttered by persons are played back at a speed at which their contents can be recognized, and periods (periods B) that do not include any voice uttered by persons are played back at a higher speed in the moving image quick preview playback mode without disturbing synchronization between video and audio data. In this manner, the total browse time upon moving image quick preview playback can be efficiently reduced compared to normal-speed playback.

According to this embodiment, the playback speeds of periods A and B can be easily changed to those suited to each individual user using the user profile 14, and the tone volume upon playing back periods B can be set in correspondence with the user.

According to the embodiment described above, the browse time required for the user can be greatly reduced while voice periods uttered by a person are accurately detected, and synchronization between video and audio data is faithfully maintained in accordance with the detected voice periods.

Second Embodiment

The second embodiment of a moving image playback apparatus according to the present invention will now be described in detail with reference to the accompanying drawings. In the following description, characteristic features of this embodiment will be explained, and a repetitive description of the same parts as those in the first embodiment will be avoided.

The embodiment to be described below aims at greatly shortening the browse time required for the user while the voice periods uttered by a person are accurately detected, and synchronization between video and audio data is faithfully maintained in accordance with the detected voice periods. An outline of this embodiment will be explained below. That is, in a moving image playback apparatus, periods A which represent human utterance periods, and periods B other than periods A are determined on the basis of an audio signal contained in moving image data. Periods A undergo high-speed moving image playback within a speed range from a normal speed to a predetermined speed at which the user can recognize the contents (e.g., 1.5 to 2 times of the normal speed), while periods B are played back at a speed higher than the predetermined speed (e.g., 5 to 10 times of the normal speed) together with a playback sound at least at a small tone volume or in a silent state. In this case, the moving image playback speeds can be adjusted in accordance with the user's attribute information registered in the user profile 14.

An outline of the operation of the moving image playback apparatus in the second embodiment will be described first with reference to FIG. 11.

Figure 11:
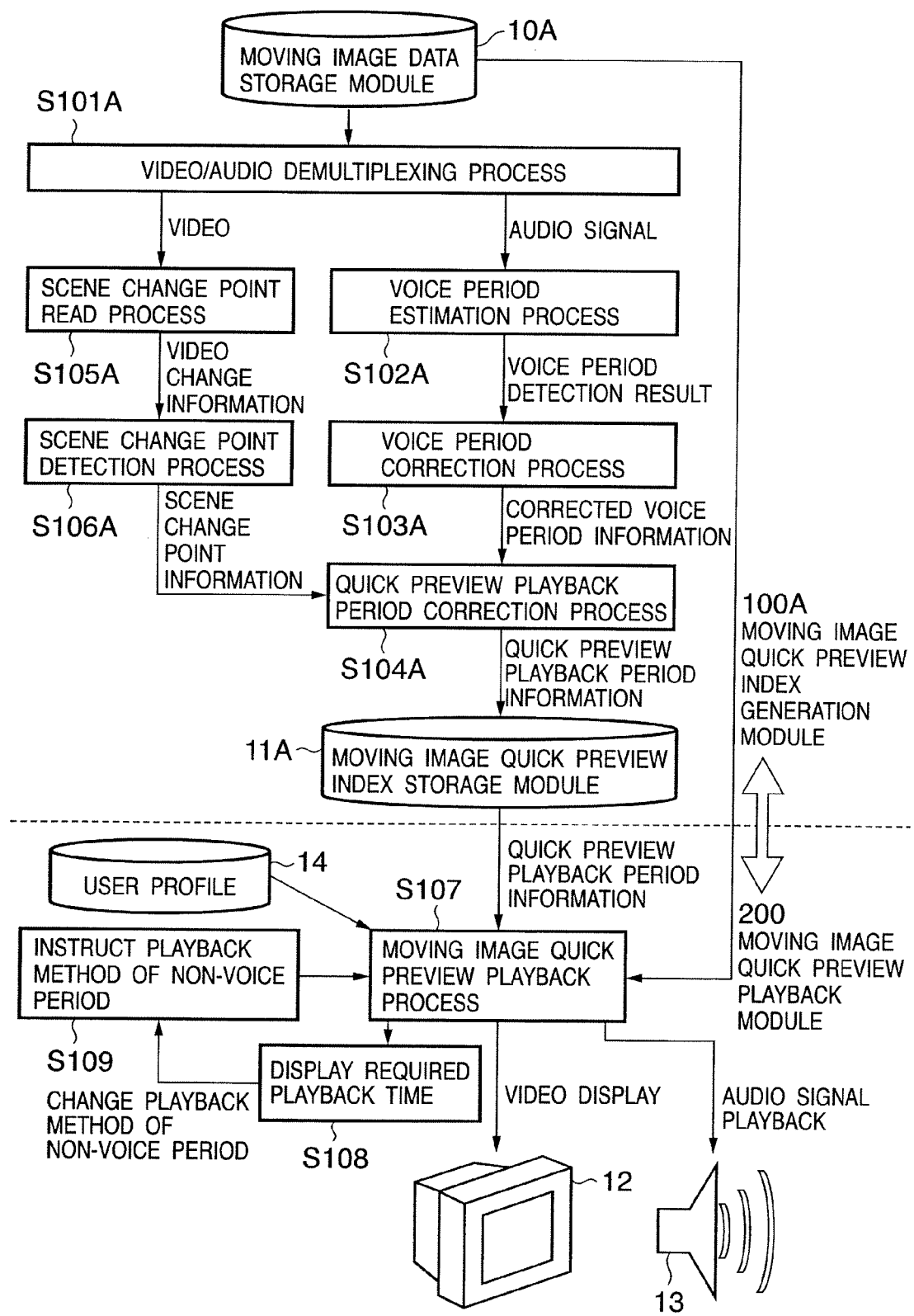
FIG. 11 is a diagram showing an outline of a moving image quick preview algorithm in a moving image playback apparatus according to the second embodiment.

FIG. 11 is a diagram showing an outline of a moving image quick preview algorithm in a moving image playback apparatus according to the second embodiment.

The moving image playback apparatus according to this embodiment roughly comprises a moving image quick preview index generation module 100A and moving image quick preview playback module 200, as shown in FIG. 11.

<Moving Image Quick Preview Index Generation Module 100A>

The moving image quick preview index generation module 100A demultiplexes moving image data read out from a moving image data storage module 10A into video data and audio data (audio signal) in a video/audio demultiplexing process (step S101A). The audio signal undergoes a voice period estimation process (step S102A) and voice period correction process (step S103A). The video signal undergoes a video change level arithmetic process (step S105A) and scene change point detection process (step S106A). A quick preview playback period correction process (step S104A) generates quick preview playback period information, which is stored in a moving image quick preview index storage module 11A.

That is, the voice period estimation process (step S102A) filters the audio signal obtained by the video/audio demultiplexing process (step S101A) using a low-pass filter to obtain zero cross points of the audio signal and to form small segments having these zero cross points as start and end points. Furthermore, when a neighboring small segment has small signal energy, that small segment is coupled to the immediately preceding small segment to determine one small segment. Note that the zero cross points are points where the waveform of the filtered audio signal crosses zero level as a reference signal level.

Individual small segments determined in this way are assigned attribute information indicating their natures as labels. This label includes a label corresponding to a voice pitch, and a voice pitch segment has voice pitch cycle information (to be described in detail later).

In this embodiment, upon voice detection, on the authority of such segments having voice pitch labels, the distance (i.e., a time interval; the same applies to the following description) between neighboring segments having voice pitch labels undergoes a threshold value process. Using continuity of voice pitch cycle information contained in each of these voice pitch segments, a plurality of small segments having discrete voice pitch labels are integrated into one segment in consideration of both the continuity of the voice pitch cycle and the distance between segments, thereby accurately detecting a voice period.

In the voice period correction process (step S103A), a plurality of neighboring voice periods are integrated to correct a voice period (to be referred to as a "human voice period" or period A hereinafter) which represents a new human utterance period to be played back on the basis of the processing result of the voice period estimation process (step S102A), so as not to give umbrage to a person (user), thus acquiring corrected voice period information.

As a bad example upon high-speed moving image playback, when the interval between two neighboring periods A is small, if these voice periods undergo multiple-speed audible playback (e.g., double-speed playback) at a speed which is as low as a person can understand the contents, and periods (to be referred to as periods B hereinafter), which are not human voice periods, are played back at a multiple speed which is too high for a person to recognize the contents of a playback video upon moving image playback, the playback modes change too frequently, and playback voice is offensive to the ears for normal users.

Therefore, in this embodiment as well, the voice period correction process (step S103A) considers the interval between neighboring human voice periods, and when the interval meets a predetermined condition, a plurality of human voice periods are combined, thus eliminating offensiveness to the ears. It is easiest to set, as the predetermined condition, that the interval between neighboring human voice periods is equal to or smaller than a predetermined threshold value.

In the video change level arithmetic process (step S105A), video data obtained by the video/audio demultiplexing process (step S101A) undergoes an inter-frame similarity comparison process described in Japanese Patent Laid-Open No. 2000-235639 to calculate the inter-frame similarity, thus generating video change information.

In general, moving image data containing an audio signal has a video change point, and if a voice period starts immediately after that video change point, a video at the beginning of a scene is played back at high speed in split seconds, and a video image is then played back by multiple-speed audible playback at a speed at which a person can recognize the audio contents. Hence, the user experiences unnatural flickering of video images.

In this embodiment, the scene change point detection process (step S106A) detects scene change points (scene change point information) on the basis of video change information obtained by the video change level arithmetic process (step S105A) by adopting a scene change point detection technique disclosed in Japanese Patent Laid-Open No. 2000-235639 previously filed by the present applicant.

In the quick preview playback period correction process (step S104A), when a given scene change point is earlier than the beginning of a voice period after the voice period correction process in step S103A and is nearest to that period, and the distance between the scene change point and the period is equal to or smaller than a predetermined value, the beginning of the voice period is replaced by information corresponding to a scene change point acquired in step S106A, thus removing the user's disrupted feeling.

<Moving Image Quick Preview Playback Module 200>

In this embodiment, since the operation of the moving image quick preview playback module 200 is the same as that in the first embodiment, a description thereof in this embodiment will be omitted.

<Details of Operation of Moving Image Playback Apparatus>

Details of the operation of the moving image playback apparatus according to this embodiment that have been explained briefly will be described below. In the following description, a case will be exemplified wherein quick preview playback period information is generated as index information for quick preview of already recorded moving image data which is stored in the moving image data storage module 10A, and quick preview playback of the moving image is made using the generated information.

In this embodiment, post-processes after the video/audio demultiplexing process in step S101A are roughly classified into a moving image quick preview index generation process by the moving image quick preview index generation module 100A, and a moving image quick preview playback process by the moving image quick preview playback module 200.

<Moving Image Quick Preview Index Generation Module 100A>

Figure 12:
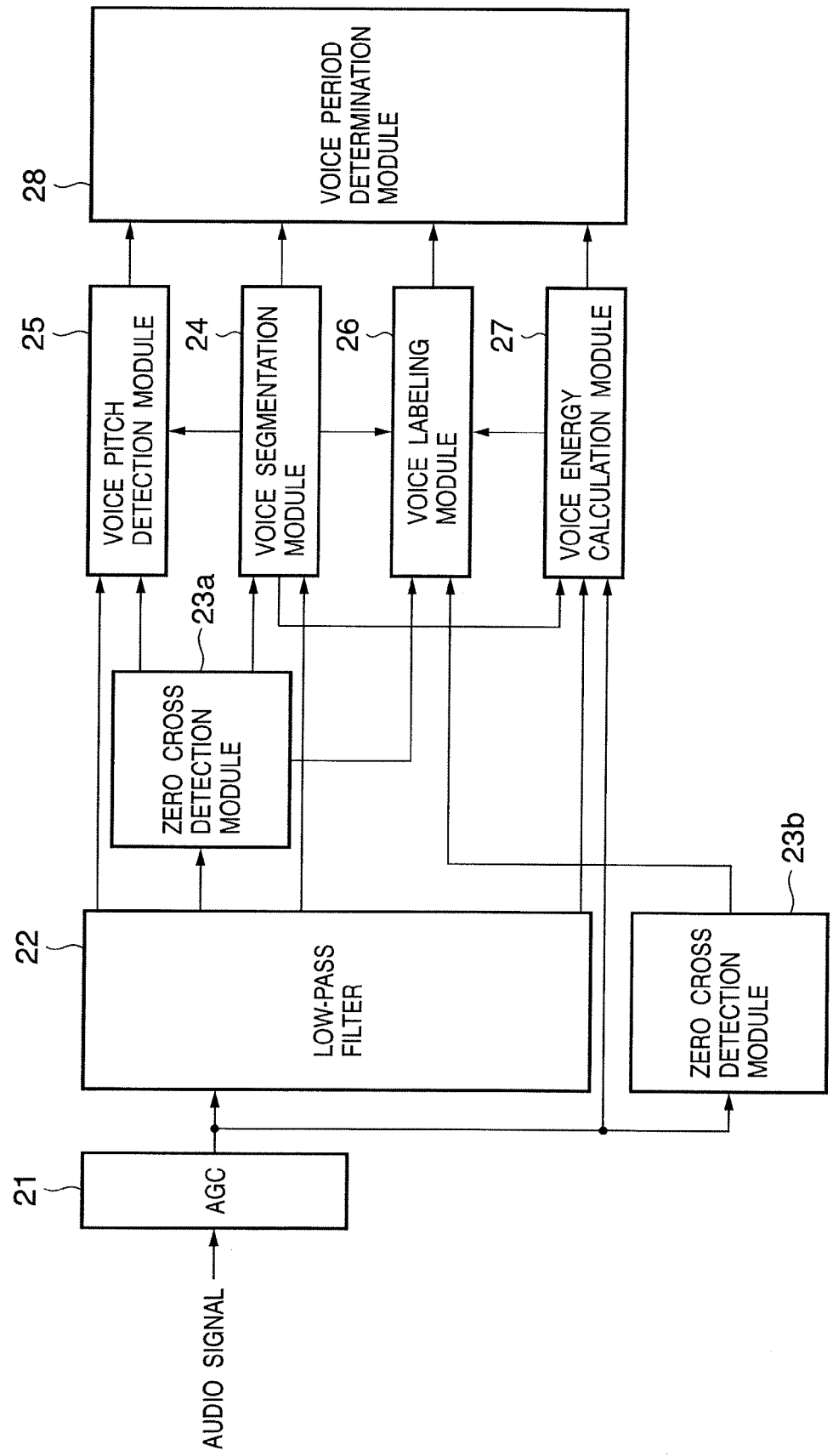
FIG. 12 is a block diagram showing an algorithm for detecting a voice period (period A) which represents a human utterance period, executed by a moving image quick preview index generation module 100.

FIG. 12 is a block diagram showing an algorithm for detecting voice periods (periods A) that represent human utterance periods, which is executed by the moving image quick preview index generation module 10A. The algorithm comprises an AGC (auto gain control) 21, low-pass filter 22, zero cross detection modules 23a and 23b, voice segmentation module 24, voice pitch detection module 25, voice labeling module 26, voice energy calculation module 27, and voice period estimation module 28.

Figure 13:
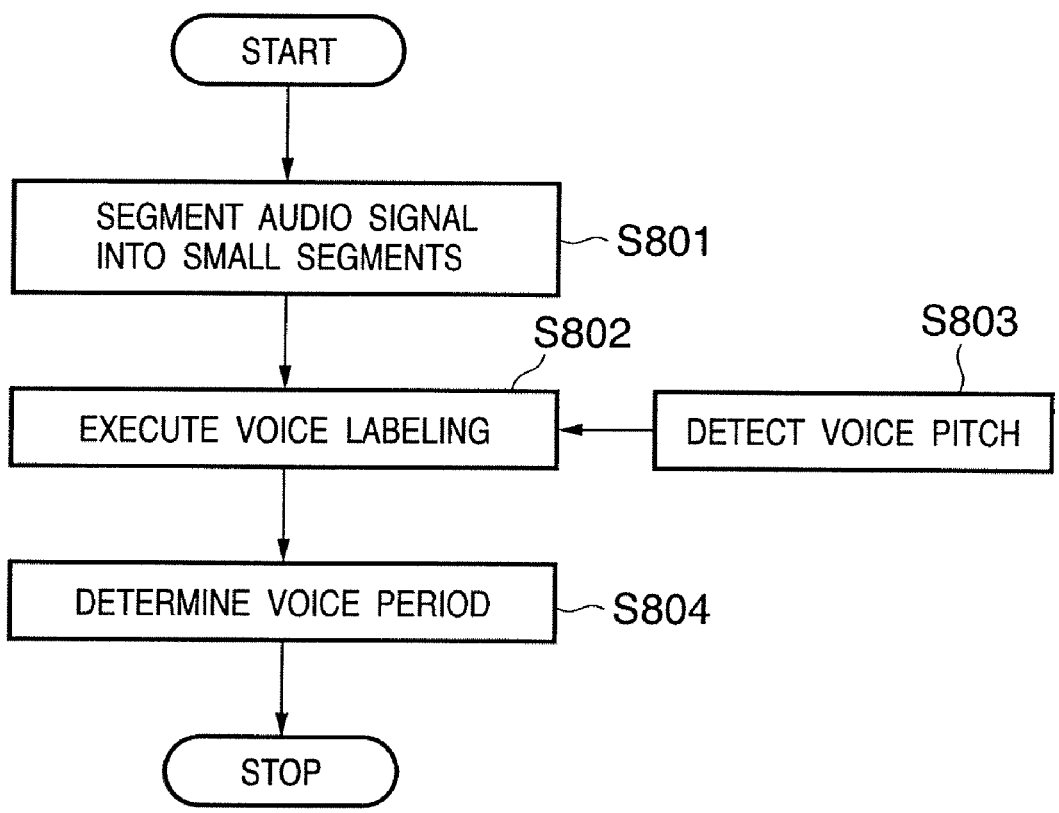
FIG. 13 is a flow chart showing an outline of a process based on the algorithm shown in FIG. 12.

FIG. 13 is a flow chart showing an outline of the process based on the algorithm shown in FIG. 12. The sequence of period A detection will be explained below with reference to this flow chart. In step S801, an audio signal is segmented into a plurality of small segments. In step S802, these small segments are assigned voice labels indicating their acoustic features. In this case, in step S803 robust vowel candidates are detected by detecting voice pitches. Finally, in step S804 human voice periods (periods A) are estimated on the basis of the voice pitch detection result.

That is, voice energy of an audio signal demultiplexed from moving image data by the video/audio demultiplexing process (step S101A) is normalized by the AGC (auto gain control) 21. The AGC 21 can adopt a known arrangement. For example, an arrangement which normalizes a registered audio signal with reference to a tone with the maximum signal level throughout the audio signal may be adopted.

The normalized audio signal is filtered by the low-pass filter 22 to be split into audio signal components in a frequency band suited to an analysis process to be executed later, and a source audio signal having a frequency band required for unvoiced consonant recognition.

(Voice Segmentation)

Zero cross points of the audio signal that has left the low-pass filter 22 are obtained by the zero cross point detection module 23a. The voice segmentation module 24 tentatively segments the audio signal into small parts called "small segments" with reference to the detected zero cross points. This process corresponds to step S801 in FIG. 13.

The reason why the low-pass filter 22 is used in segmentation is that small segments are obtained with reference to unvoiced consonants, voiced consonants, voice pitches, and the like, and high-frequency components adversely influence unvoiced consonants and the like if they are present.

The voice segmentation module 24 segments the audio signal into small segments with reference to zero cross points which are tentatively set for the audio signal. Each small segment meets:

Rule 1: the start and end points of a small segment are zero cross points; and

Rule 2: if the energy of a small segment is small, that segment is coupled to the immediately preceding small segment.

For small segment f(x) which has X1 as the start point and X2 as the end point, voice energy P is defined to satisfy:

$$P = \sum_{X=X1}^{X=X2} |f(x)| \quad (1)$$

When calculated voice energy P is equal to or smaller than a predetermined threshold value Eth1, current small segment f(x) of interest is coupled to the immediately preceding small segment. Note that voice energy P may be calculated using square energy of f(x) in place of accumulation of the absolute values of small segment levels f(x) given by equation (1).

FIGS. 14A and 14B are charts for explaining the small segment coupling process executed in this embodiment.

FIG. 14A shows an example of the audio signal level, a plurality of zero cross points of which are obtained by the zero cross detection module 23a. In FIG. 14B, a plurality of small segments set by applying the detected zero cross points, and rules 1 and 2 mentioned above are indicated by the vertical bars, and two small segments indicated by an arrow are coupled into one segment by rule 2 mentioned above.

(Voice Labeling Process)

The zero cross detection module 23b calculates an average zero cross count of the audio signal waveform, whose voice energy has been normalized by the AGC 21, and which crosses zero level as a reference level. Also, the voice energy calculation module 27 calculates average energy. After that, the voice labeling module 26 calculates the start point, end point, average zero cross count, and average energy for each small segment, and stores the calculated values as feature amounts of that small segment. This process corresponds to step S802 in FIG. 13.

Note that the average zero cross count and average energy are calculated using segment length SegLen by:

(Average zero cross count)=(number of zero cross points of source audio signal included in small segment)/SegLen (Average energy)=(energy of audio signal filtered by low-pass filter, which is included in small segment)/SegLen Furthermore, small segments are classified into five different categories, and are assigned labels indicating their categories. In this embodiment, the types of labels that can be assigned to individual small segments include silence, unvoiced consonant, voiced consonant, voice pitch, and noise.

Figure 15:
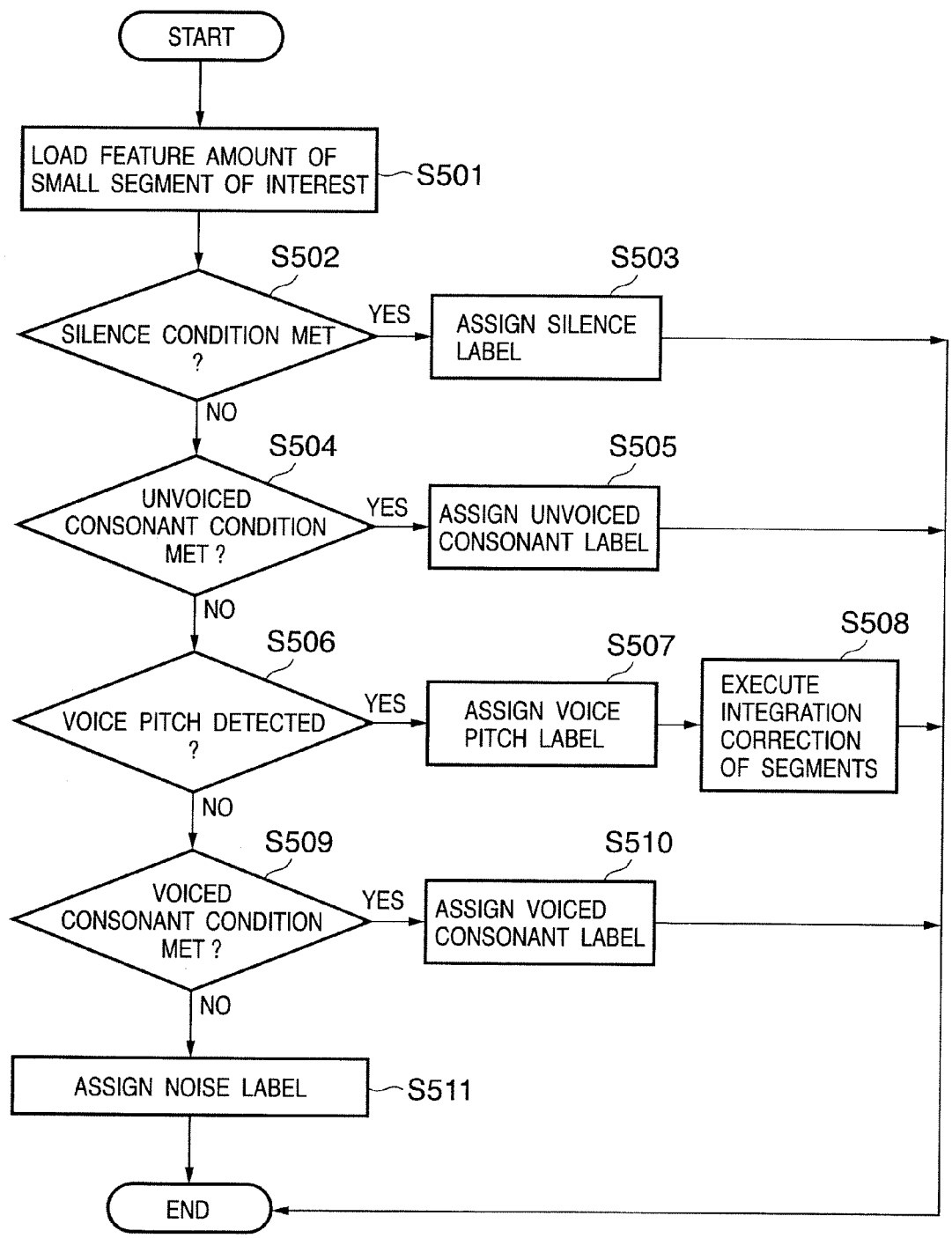
FIG. 15 is a flow chart showing a voice labeling process executed in the second embodiment.

The label of the current small segment of interest is determined in a sequence shown in FIG. 15.

FIG. 15 is a flow chart showing the voice labeling process executed in the second embodiment, i.e., the sequence of the process executed by the voice labeling module 26.

Referring to FIG. 15, average zero cross count AveZeroCrossRate and average energy AveEnergy are loaded as feature amounts of a small segment of interest (a small segment to be processed) in step S501.

In this embodiment, the following threshold values are used as label determination conditions, and all these threshold values are constants.

Threshold value representing maximum energy of silence: SileceEnergyMax,

Minimuim energy threshold value of unvoiced consonant: ConHEnergyLow,

Maximum energy threshold value of unvoiced consonant: ConHEnergyMax,

Minimum energy threshold value of voiced consonant: ConLEnergyLow,

Maximum energy threshold value of voiced consonant: ConLEnergyMax,

Minimum zero cross threshold value of unvoiced consonant: ConHZeroCrossRateLow, and Maximum zero cross threshold value of voiced consonant: ConLZeroCrossRateMax.

For SileceEnergyMax>ConHEnergyLow.

It is determined in step S502 whether or not the feature amounts loaded in step S501 meet a predetermined silence label condition. Note that the silence label condition is given by:

((AveEnergy<SileceEnergyMax) AND (AveZeroCrossRate<ConHZeroCrossRateLow)), or ((AveEnergy<ConHEnergyLow) AND (AveZeroCrossRate>ConHZeroCrossRateLow))

If the aforementioned silence label condition is met, a silence label is stored in association with the small segment of interest in step S503.

On the other hand, if the silence label condition is not met in step S502, it is determined in step S504 whether or not the feature amounts loaded in step S501 meet a predetermined unvoiced consonant label condition. Note that the unvoiced consonant label condition is given by:

(ConHEnergyLow<AveEnergy<ConHEnergyMax) and (AveZeroCrossRate>ConHZeroCrossRateLow)

If the unvoiced consonant label condition is met, an unvoiced consonant label is stored in association with the small segment of interest in step S505.

Since the feature amounts loaded in step S501 meet neither the silence label condition nor the unvoiced consonant label condition, an attempt is made to detect a voice pitch in step S506. If the voice pitch can be detected, a voice pitch label is assigned to a corresponding small segment group (step S507). Note that pitch detection will be described in detail later.

Note that the voice pitch label is assigned to the "small segment group" for the following reason. That is, pitch detection to be described later may integrate small segments. In such case, a plurality of small segments after the small segment of interest are integrated into one segment in step S508, and a pitch label is assigned to that segment. At this time, a segment from which the voice pitch is detected is mainly a vowel with vocal-fold vibrations.

If the voice pitch cannot be detected in step S506, it is checked in step S509 if a voiced consonant label condition is met. At this time, the voiced consonant label condition is given by:

(ConLEnergylow<AveEnergy<ConLEnergyMax) and
(AveZeroCrossRate<ConLZeroCrossRateMax)

If the voiced consonant label condition is met, a voiced consonant label is stored in association with the small segment of interest in step S510.

Since none of the above conditions are met, a noise label is assigned in association with the small segment of interest in step S511.

The processes from segmentation of the audio signal waveform until labeling will be explained below with reference to an example shown in FIGS. 16A to 16C.

FIGS. 16A to 16C are charts for explaining the processes from segmentation of the audio signal waveform until labeling in the second embodiment.

More specifically, FIG. 16A shows the audio signal waveform after low-pass filtering. FIG. 16B shows small segments obtained with reference to zero cross points of the audio signal waveform shown in FIG. 16A. The bold vertical bars in FIG. 16B indicate the bounds of small segments.

FIG. 16C shows the result of voice labeling and segmentation. The thin vertical bars in FIG. 16C indicate the bounds of segments, and the bold vertical bars indicate the traces of integrated small segments. As can be seen from FIG. 16C, some of small segments segmented, as shown in FIG. 16B, are integrated into one pitch segment, and labels assigned to respective segments are specified.

(Voice Pitch Detection)

The operation of the voice pitch detection module 25 will be described below with reference to FIG. 19 and FIGS. 20A and 20B. This process corresponds to step S803 in FIG. 8.

Figure 19:
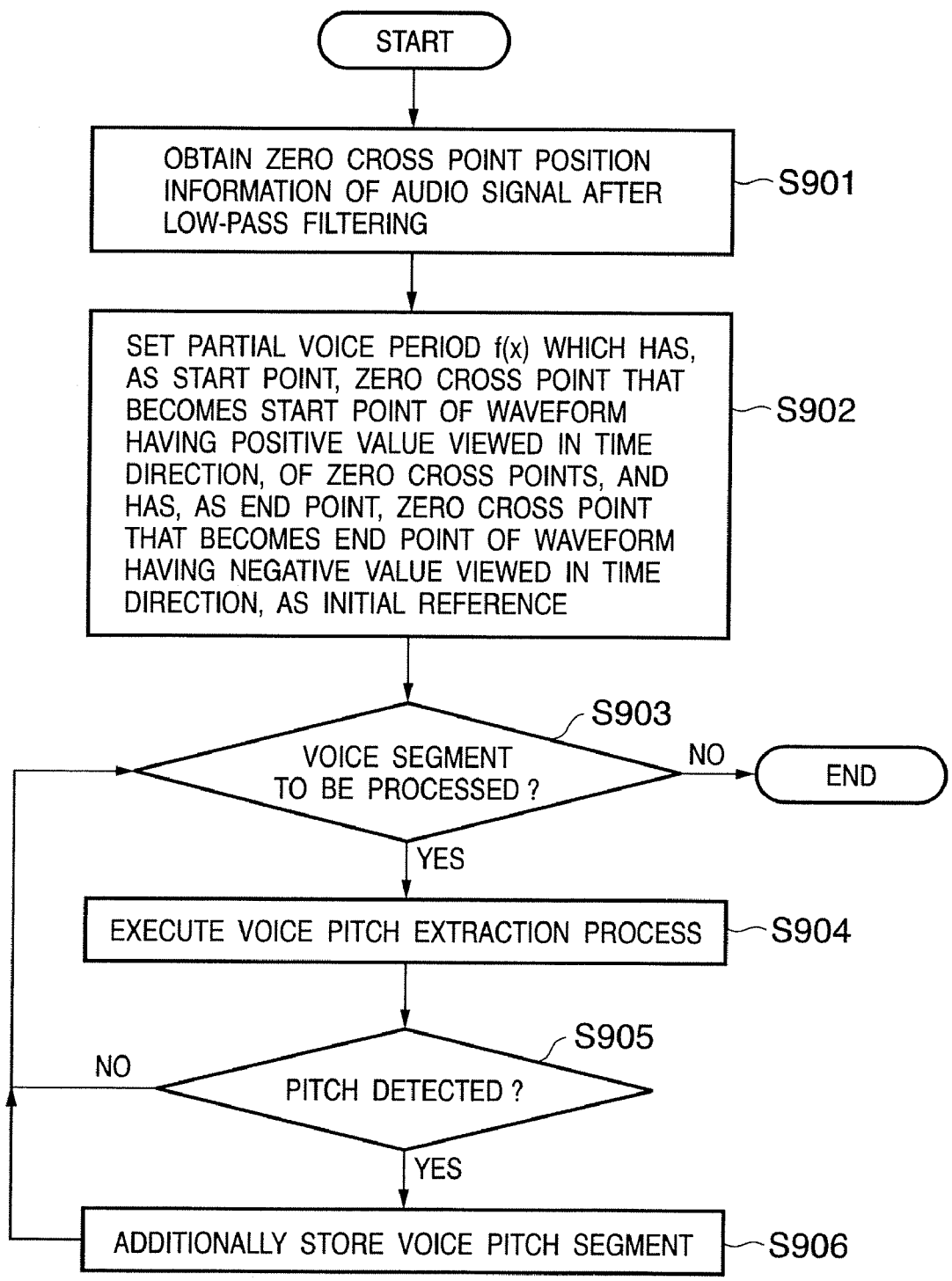
FIG. 19 is a flow chart showing the voice pitch detection process in the second embodiment.

FIG. 19 is a flow chart showing the voice pitch detection process in the second embodiment, i.e., the processing sequence to be executed by the voice pitch detection module 25.

Referring to FIG. 19, zero cross point information of the audio signal waveform after low-pass filtering is acquired in step S901. Then, the similarity of the waveform is verified with reference to the zero cross points to obtain a voice pitch.

Figure 17:
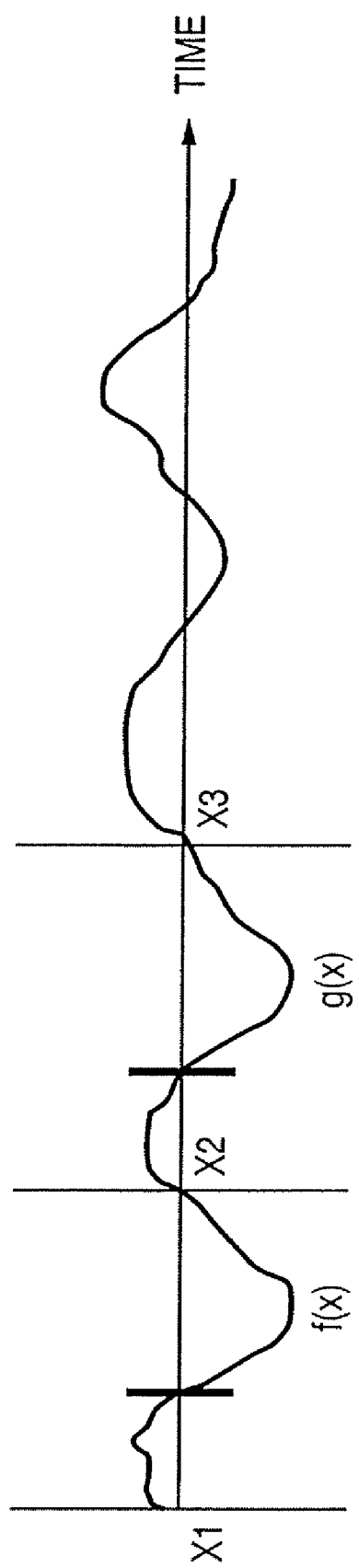
FIG. 17 is a chart showing an example of an audio waveform used to explain a voice pitch detection process in the second embodiment.

FIG. 17 is a chart showing an example of the audio waveform used to explain the voice pitch detection process in this embodiment.

In this embodiment, reference zero cross points are start points of partial waveforms having a positive value viewed in the time direction. In the example in FIG. 17, reference zero cross points are X1, X2, and X3.

In step S902, in the example shown in FIG. 17, partial waveform f(x) which has zero cross point X1 as a start point and zero cross point X2 as an end point, and partial waveform g(x) which has zero cross point X2 as a start point and zero cross point X3 as an end point are set as initial references.

It is checked in step S903 if voice periods (voice segments) to be processed still remain. If such voice periods still remain, the flow advances to step S904; otherwise, the process ends.

In step S904, a pitch extraction process for reporting the presence/absence of a voice pitch and its segment range if it is present is executed. Note that the report timing is a timing at which a voice pitch segment ends or when no pitch corresponding to partial waveform f(x) is found. Note that the pitch extraction process in step S904 will be described in detail later with reference to FIGS. 20A and 20B.

It is checked in step S905 if a voice pitch is present. If it is determined that a voice pitch is present, voice pitch segment information is stored in association with the voice period (voice segment) of interest in step S906. On the other hand, if a voice pitch is not present, the flow returns to step S903.

The pitch extraction process executed in step S904 will be described in detail below with reference to FIGS. 20A and 20B.

Figure 20A:
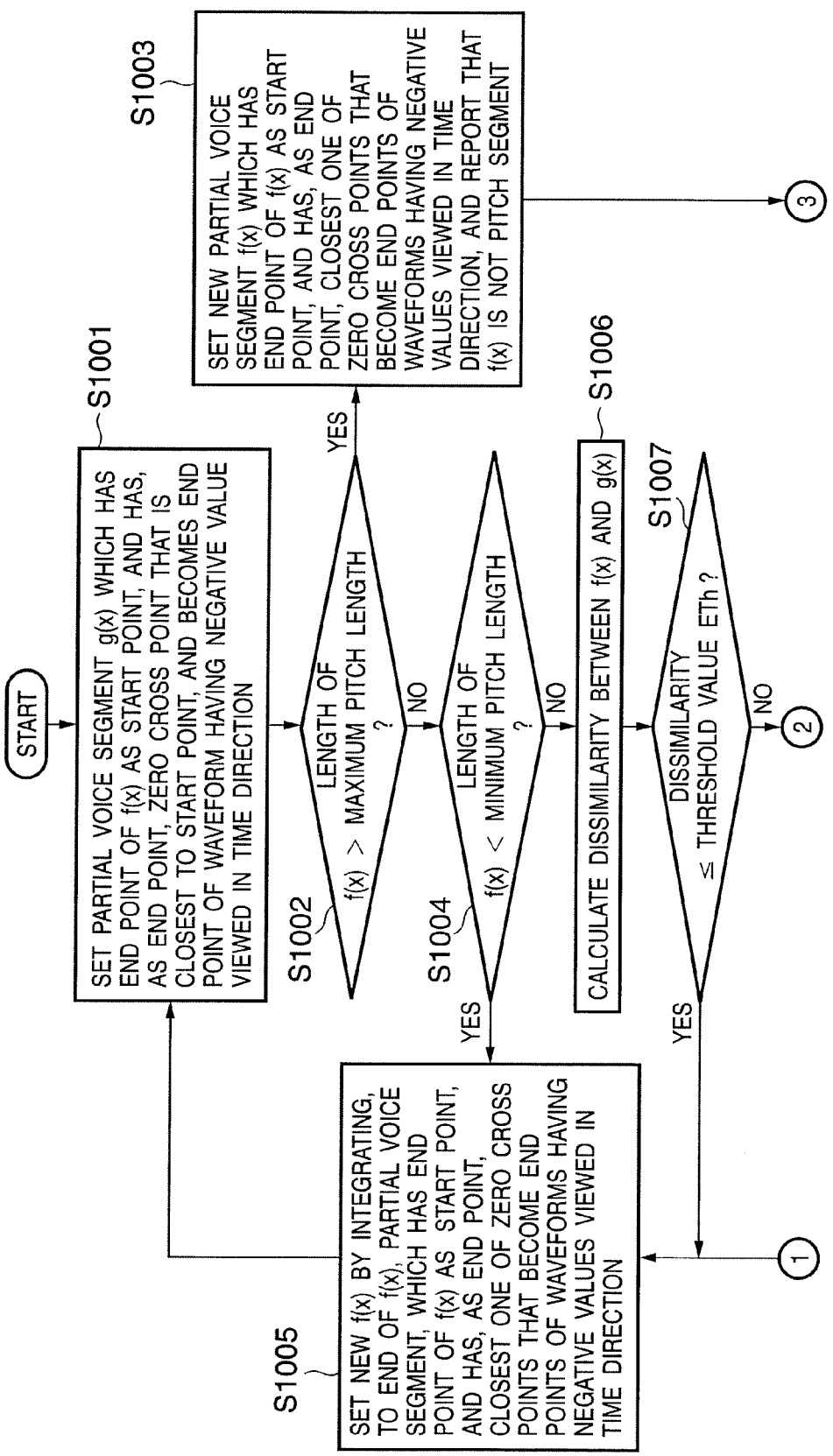
FIGS. 20A and 20B are flow charts showing details of the process in step S904 (FIG. 19) of the flow chart showing the voice pitch detection process in the second embodiment.
Figure 20B:
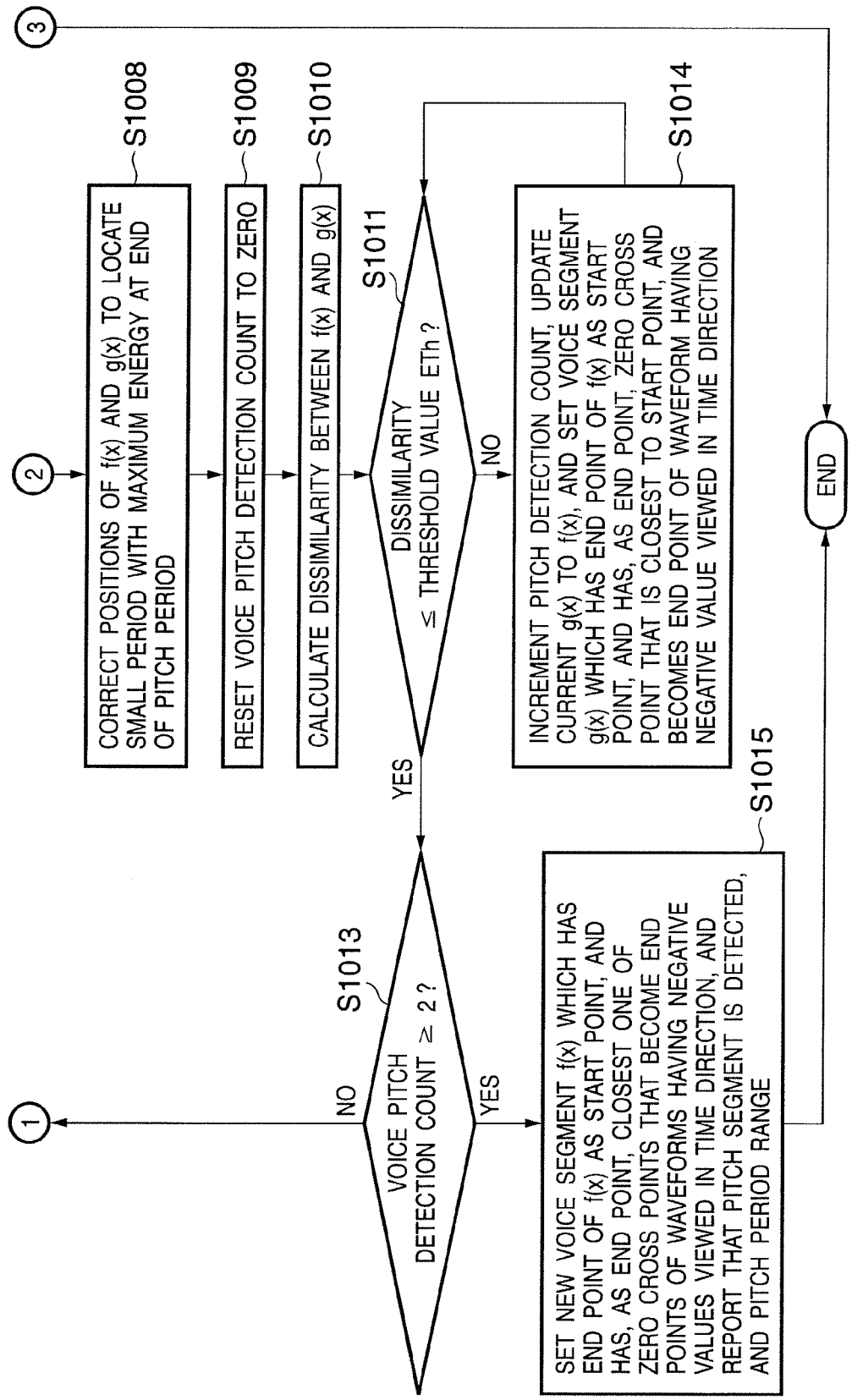

FIGS. 20A and 20B are flow charts showing details of the process in step S904 (FIG. 19) of the flow chart showing the voice pitch detection process in the second embodiment.

Referring to FIG. 20A, g(x) for f(x) set in step S902 is set in step S1001. In step S1002, the length of f(x) set in step S902 is checked. If f(x) is too long to be present as a pitch, it is determined that there is no pitch corresponding to f(x) of interest. In step S1003, new partial voice segment f(x), which has the end point of f(x) of interest as a start point, and a zero cross point, closest to that start point, of those which become end points of partial waveforms having negative values viewed in the time direction, as an end point, is set in step S1003. In addition, it is reported that old segment f(x) of interest is not a pitch segment.

Furthermore, in step S1004 the length of f(x) of interest is checked. If f(x) is too short to be present as a pitch, new f(x) is formed by integrating a partial voice segment, which has the end point of f(x) of interest as a start point, and a zero cross point, closest to that start point (end point of f(x)), of those which having negative values viewed in the time direction, as an end point, to the end of f(x) of interest in step S1005. The flow then returns to step S1001.

On the other hand, in step S1006 f(x) of interest, which has passed the checking processes in steps S1002 and S1004, undergoes a dissimilarity calculation with g(x). The dissimilarity calculation made in this step is calculated using the following dissimilarity evaluation function.

That is, let Δ(Xf) be the absolute value of the difference between f(x) and g(x) at time Xf of partial voice segment f(x) (for X1≦Xf≦X2 and Xg X2+(xf−X1). Then, Δ(Xf) is given by:

$$\Delta(Xf) = |f(Xf) - g(Xg)|$$

In this case as well, based on the square of the difference in place of the absolute value of the difference between f(x) and g(x), Δ(Xf) may be given by:

$$\Delta(Xf) = [f(Xf) - g(Xg)] \times [f(Xf) - g(Xg)]$$

Furthermore, dissimilarity evaluation function DiffSum is given by:

$$DiffSum = \sum_{X=X1}^{X=X2} \Delta(Xf) \quad (2)$$

It is checked in step S1007 if the dissimilarity calculated in this way is equal to or larger than a threshold value ETh. If DiffSum≧ETh, the flow returns to step S1005; if DiffSum<ETh, the positions of f(x) and g(x) are corrected to locate a small period with maximum energy at the end position of a pitch segment in step S1008 so as to make voice detection more precisely.

Figure 18:
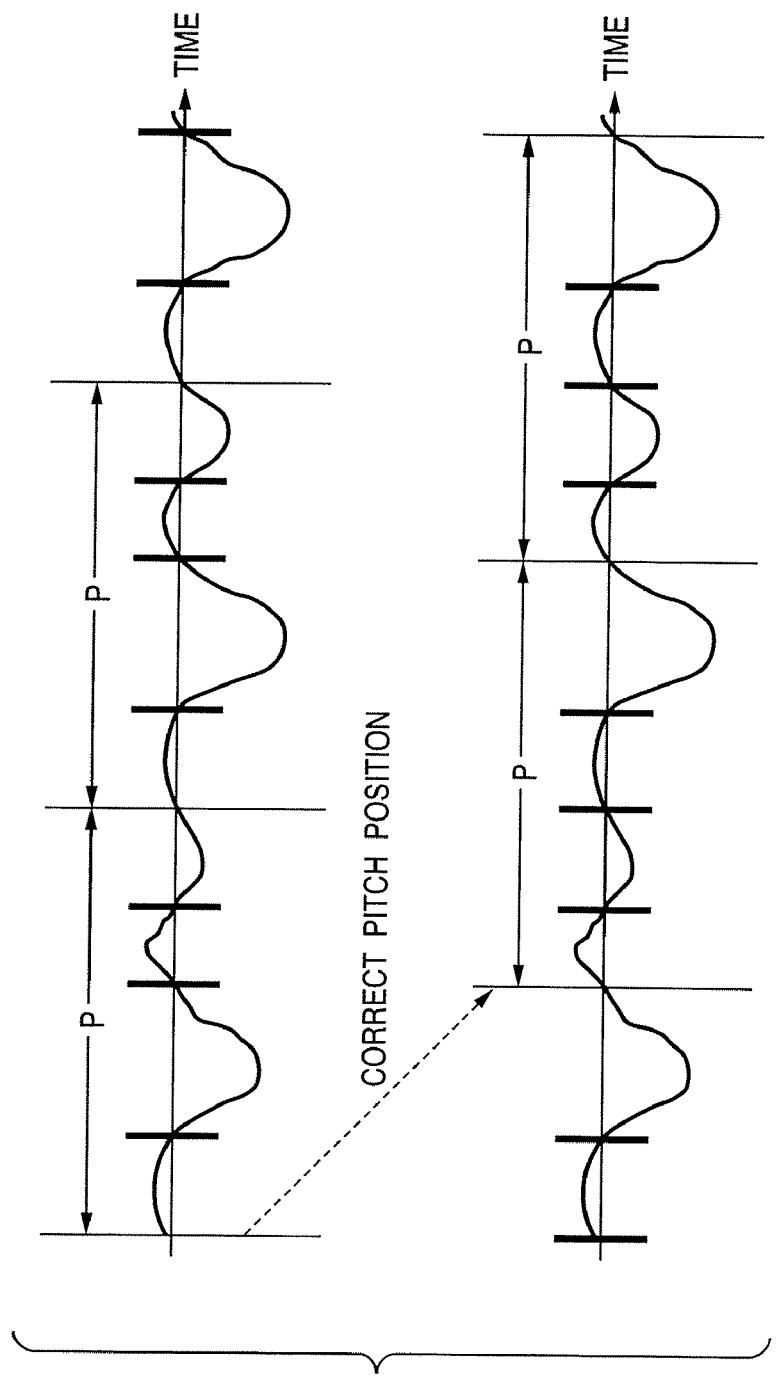
FIG. 18 is a chart for explaining a pitch detection reference update sequence done in the voice pitch detection process in the second embodiment.

FIG. 18 is a chart for explaining the update sequence of a pitch detection reference, which is executed in the voice pitch detection process in the second embodiment. It is effective to correct a pitch reference using a small period with maximum energy, since that small period is a waveform generated at a timing immediately after vocal-fold vibrations.

In step S1009, a pitch detection counter is reset to zero. In step S1010, a dissimilarity calculation is made in the same manner as in step S1006 above. In step S1011, the comparison process between the calculated dissimilarity and threshold value ETh is executed as in step S1007 above.

If the calculated dissimilarity is equal to or larger than the threshold value ETh as a result of comparison in step S1011, the flow advances to step S1013; otherwise, the flow advances to step S1014.

It is checked in step S1013 if the voice pitch has been detected twice or more. If the voice pitch has been detected less than twice, voice segments are integrated in step S1005; otherwise, since it is determined that the voice pitch segment has been detected, new segment f(x) which has the end point of g(x) as a start point, and a zero cross point, closest to that start point, of those which become end points of partial waveforms having negative values viewed in the time direction, as an end point, is set in step S1015, thus reporting a pitch segment range which represents that the pitch segment has been detected.

In step S1014, a pitch detection count is incremented. Also, new partial voice segment f(x) which has the end point of current g(x) as a start point, and a zero cross point, closest to that start point, of those which become end points of partial waveforms having negative values viewed in the time direction, as an end point, is set. Furthermore, new g(x) which has a zero cross point, closest to that partial voice segment f(x), of those which become end points of partial waveforms having negative values viewed in the time direction, as an end point, is set. The flow then returns to step S1010.

The voice pitch segment acquired by the aforementioned voice pitch detection process (FIG. 19 and FIGS. 20A and 20B) is stored in a memory (not shown), so as to be used by the voice period determination module 28 to be described below.

(Voice Period Determination)

The voice period determination module 28 determines human voice periods (periods A) using the voice pitch segment acquired by the aforementioned voice pitch detection process. This process corresponds to step S804 in FIG. 13.

In general, in case of a pure human voice, most part of its voice period is occupied by vowels and, hence, a pitch segment stably appears long time. On the other hand, if BGM is present, a pitch segment is influenced by its prosody, but that influence is not so serious when human voice energy is larger than BGM energy to some extent. If voice energy is not sufficiently larger than BGM energy in a given partial period, no accurate pitch appears in that partial period.

In most cases, a consonant is attached immediately before a vowel. In case of a consonant which is not based on vocal-fold vibrations, no pitch appears, and such consonant is a short plosive having a duration of 10 ms or less. Even in case of the longest fricative, its duration is on the order of several 10 ms. A silence is often produced immediately before generation of a plosive or the like.

Therefore, segments from which the voice pitch can be obtained are discrete ones due to not only factors outside the apparatus but also factors of human voice itself. Even in such case, a human voice period (period A) must be determined by integrating the calculation results of voice pitch cycles of partial periods in consideration of neighboring or whole pitch cycles, and also using features of voice.

Figure 21:
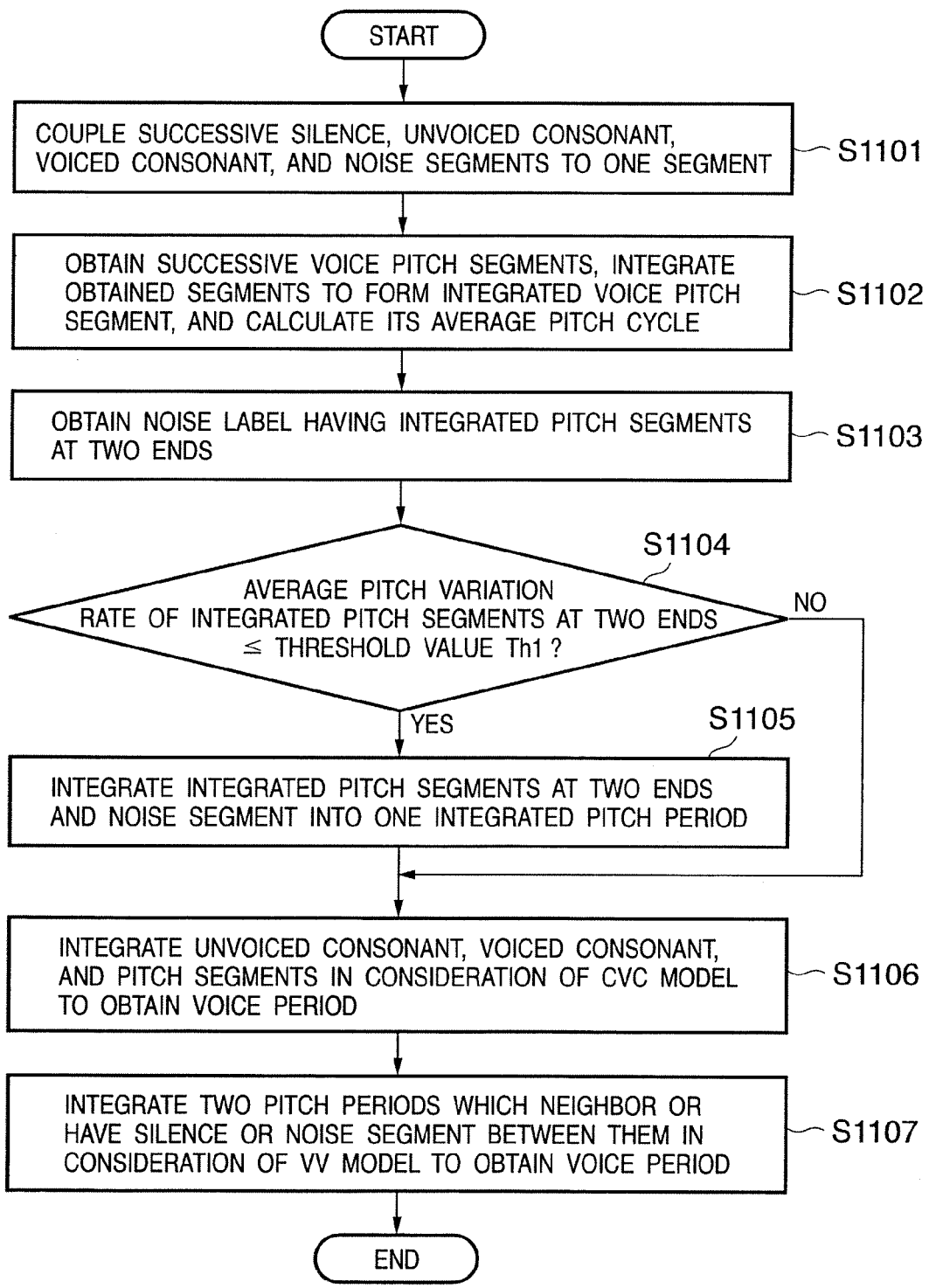
FIG. 21 is a flow chart showing a voice period determination process in the second embodiment.

FIG. 21 is a flow chart showing the voice period determination process in the second embodiment, i.e., the processing sequence to be executed by the voice period determination module 28.

Referring to FIG. 21, successive segments having silence, unvoiced consonant, voiced consonant, or noise labels are coupled into a single segment in step S1101.

In step S1102, successive pitch label segments are obtained, and are coupled to calculate the average pitch cycle of these segments. The coupled pitch segment will be referred to as an "integrated pitch segment" hereinafter.

In step S1103, a segment which is associated with a noise label and is sandwiched between integrated pitch segments is obtained. It is checked in step S1104 if the average pitch cycle variation rate of the integrated pitch segments at the two ends of that segment is equal to or smaller than a given threshold value Th1. If this condition is met, these segments are integrated to one integrated pitch segment in step S1105. With this process, even when BGM with large energy partially overlaps a pitch segment, i.e., a vowel, correction can be made.

In most cases, since no isolated consonant exists, a consonant often appears together with another consonant in the rear of or ahead of it. This is called a CVC (Consonant Vowel Consonant) model.

Hence, in step S1106, an unvoiced consonant segment, voiced consonant segment, and pitch segment are integrated based on this CVC model to obtain a voice period. Details of the process in step S1106 will be explained below with reference to FIG. 22.

Figure 22:
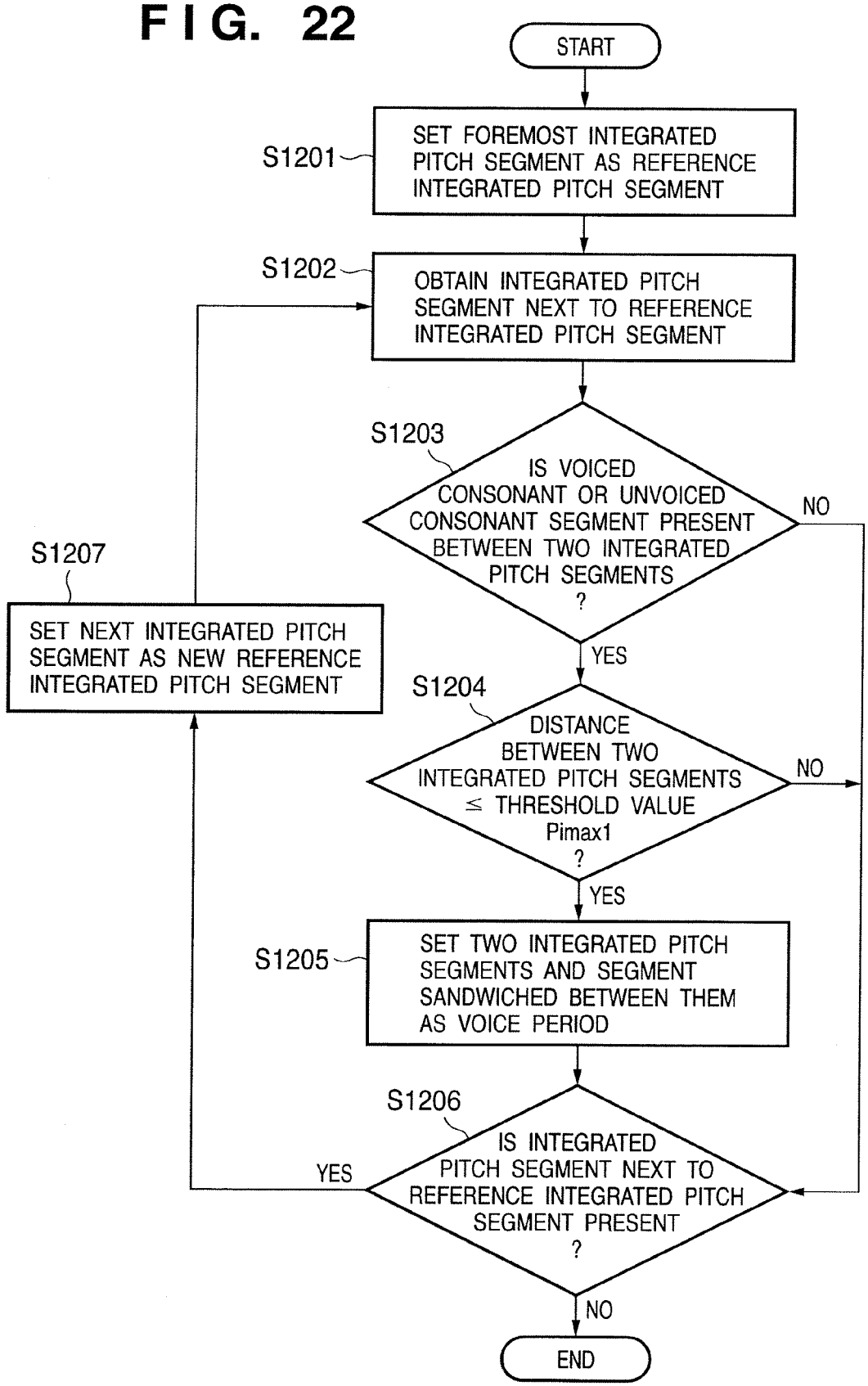
FIG. 22 is a flow chart showing details of the process in step S1106 (FIG. 21) of the flow chart showing the voice period determination process in the second embodiment.

FIG. 22 is a flow chart showing details of the process in step S1106 (FIG. 21) of the flow chart showing the voice period determination process in the second embodiment.

Referring to FIG. 22, a foremost integrated pitch segment is defined as a reference integrated pitch segment in step S1201. In step S1202, an integrated pitch segment next to the reference integrated pitch segment is obtained.

It is checked in step S1203 if a voiced consonant segment or unvoiced consonant segment is present between the two integrated pitch segments. If such segment is not present, it is checked in step S1206 if an integrated pitch segment next to the reference integrated pitch segment is present. If such segment is not present, the process ends; otherwise, the reference integrated pitch segment is updated in step S1207.

On the other hand, if it is determined in step S1203 that a voiced consonant segment or unvoiced consonant segment is present between the two integrated pitch segments, it is checked in step S1204 if a distance Dist between the two integrated pitch segments is equal to or smaller than a threshold value Pimax1. If the distance Dist is equal to or smaller than the threshold value Pimax1, a period having the end points of the two integrated pitch segments as end and start points is stored as a human voice period in step S1205.

Note that the threshold value Pimax1 preferably uses a value sufficiently larger than the duration of a consonant having the longest duration, e.g., that of an unvoiced fricative /s/ or the like. In this case, not only a consonant segment but also a silence segment can be present between the two integrated pitch segments. This is because a plosive and fricative of unvoiced consonants often have short silence before utterance.

After the voice period is stored in step S1205, it is checked in step S1206 if an integrated pitch segment next to the reference integrated pitch segment is present. If such segment is not present, the process ends; otherwise, the reference integrated pitch segment is updated in step S1207. The processes in the aforementioned steps are repeated until an end condition of step S1206 is met. Note that integrated pitch segment information and its average pitch information are saved for the next process without being discarded.

On the other hand, if it is determined in step S1204 that the cycle variation rate is larger than the threshold value Pimax1 as a result of comparison of the average pitch cycles of the two integrated pitch segments, the aforementioned processes in step S1206 and the subsequent steps are executed.

The description will revert to the flow chart of FIG. 21. In step S1107, a voice period is obtained by integrating two pitch segments, which neighbor or have a silence segment or noise segment between them on the basis of a VV (Vowel-Vowel) model, so as to consider a non-CVC structure, e.g., a VV structure (e.g., "/AO/").

The voice period detection process executed in step S1107 will be described in detail below with reference to FIG. 23.

Figure 23:
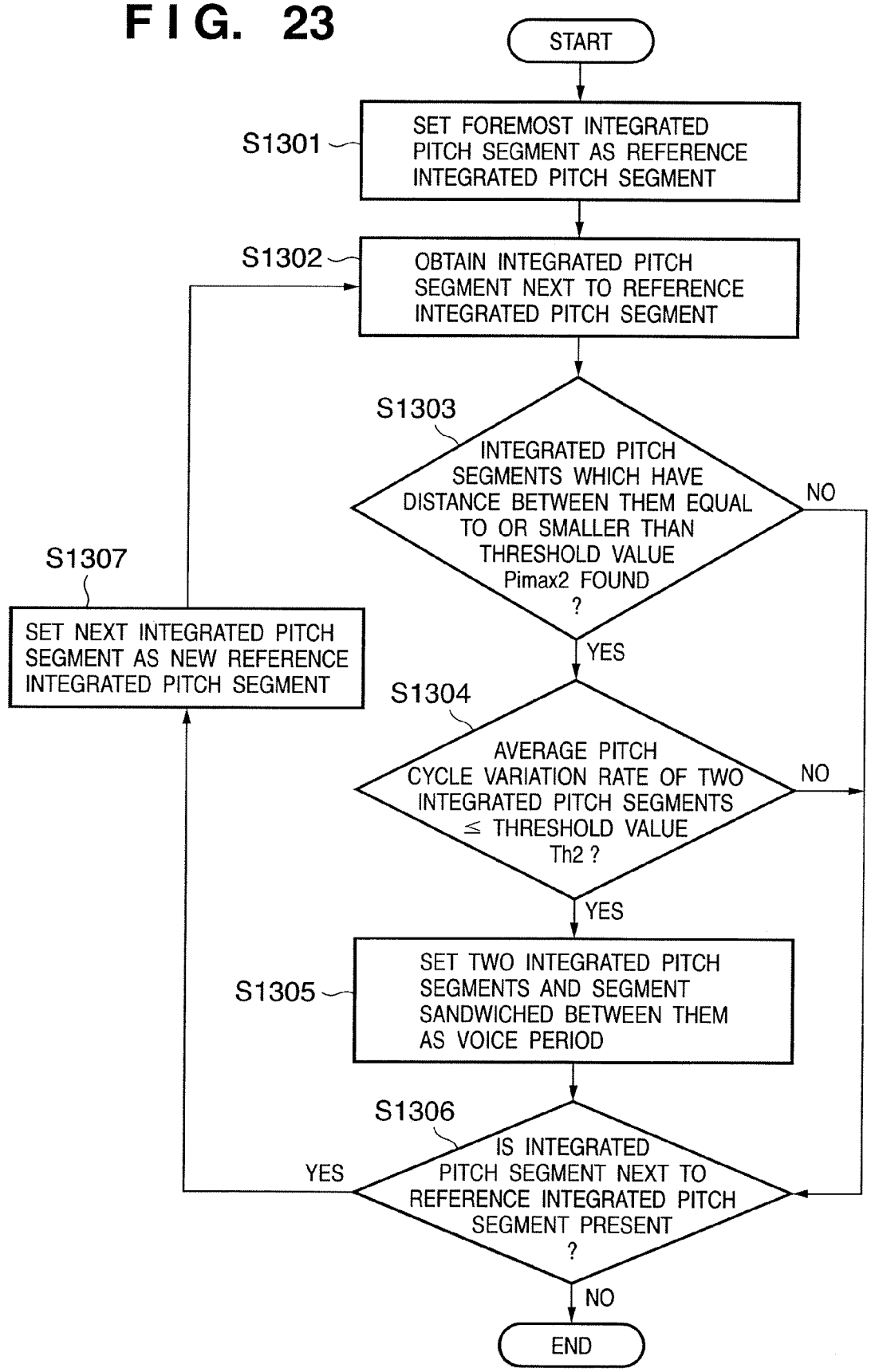
FIG. 23 is a flow chart showing details of the process in step S1107 (FIG. 21) of the flow chart showing the voice period determination process in the second embodiment.

FIG. 23 is a flow chart showing details of the process in step S1107 (FIG. 21) of the flow chart showing the voice period determination process in the second embodiment.

Referring to FIG. 23, a foremost integrated pitch segment is defined as a reference integrated pitch segment in step S1301. In step S1302, an integrated pitch segment next to the reference integrated pitch segment is obtained.

It is then checked in step S1303 if a distance Dist between the two integrated pitch segments is equal to or smaller than a threshold value Pimax2. If the distance Dist is larger than the threshold value Pimax2, the flow jumps to step S1306; if the distance Dist is equal to or smaller than the threshold value Pimax2, the flow advances to step S1304.

If it is determined in step S1304 that the average pitch cycle variation rate of the two integrated pitch segments is equal to or smaller than a given threshold value Th2, the two integrated pitch segments and a segment sandwiched between them are stored as a voice period in step S1305. In this case, a silence segment or noise segment may be present between the two integrated pitch segments to improve the robustness against any disturbance.

After the voice period is stored in step S1305, it is checked in step S1306 if an integrated pitch segment next to the reference integrated pitch segment is present. If such segment is not present, the process ends; otherwise, the reference integrated pitch segment is updated in step S1307. Then, the processes are repeated until an end condition in step S1306 is met.

On the other hand, if it is determined in step S1304 that the cycle variation rate is larger than the threshold value Th2 as a result of comparison of the average pitch cycles of the two integrated pitch segments, the flow jumps to step S1306 to repeat the above processes.

In this way, the processes are done with reference to segments from which the pitch is detected. Hence, even when a noise label is assigned due to BGM or the like contained in an audio signal in the aforementioned voice period determination process in this embodiment, integrated pitch segments are integrated in consideration of the continuity of the average pitch cycles of the integrated pitch segments before and after that noise segment. Furthermore, by adopting the CVC model, integrated pitch segments between which an unvoiced consonant segment or voiced consonant segment is present are integrated to determine a voice period. Furthermore, a voice period is determined by integrating two integrated pitch segments in consideration of the VV model, thus allowing voice period extraction which exploits features of voice and is robust against any disturbance.

(Correction of Human Voice Period)

In a voice period correction process executed after the human voice periods (periods A) are detected, as described above, correction is made by integrating a plurality of voice periods, which are located at neighboring positions on the time axis, into a single voice period, so as to prevent the user who hears playback voice based on the processing result from feeling disrupted. This is for the following reason. For example, if the interval between two neighboring periods A on the time axis is small, if multiple-speed audible playback of periods A is made at a speed at which a person can audibly recognize the contents of period A, while multiple-speed playback of periods B is made at a higher multiple speed within the range in which a person can visually recognize the contents of a playback video, the playback modes change too frequently, and playback voice is offensive to the ears of the user.

Also, in terms of a moving image decoder and a playback process, the experiments of the present applicant using DirectShow available from Microsoft demonstrate that changes in speed at short intervals impose heavy overhead on processes, and a playback operation is paused, resulting in non-smooth playback. Also, similar phenomena are observed in many other moving image playback means.

In this embodiment, when the interval between two voice periods (periods A) which are closest on the time axis is equal to or smaller than a given threshold value (Th3 in FIG. 3), correction is made by integrating these voice periods. Upon determination of this threshold value, for example, a scene of a conversation is assumed, and an interval that allows the conversation is experimentally obtained and is used as the threshold value.

In the second embodiment as well, the integration correction process executed for voice periods with short intervals is the same as the processing sequence that has been explained in the first embodiment with reference to the flow chart of FIG. 3. This process is executed by the voice period determination module 28 in this embodiment, and corresponds to details of the aforementioned voice period correction process (step S103A).

In this embodiment, such integration process is also repeated until all voice periods (periods A) are processed.

(Correction of Human Voice Period Using Scene Change Point Information)

In the second embodiment, human voice periods are corrected using scene change point information in the same sequence as the processing sequence that has been explained in the first embodiment.

In the second embodiment, the integration correction process of voice periods, which is executed using scene change points, is the same as the processing sequence that has been explained in the first embodiment with reference to the flow chart of FIG. 4. This process is executed by the voice period determination module 28 in this embodiment, and corresponds to details of the aforementioned quick preview playback period correction process (step S10A).

The corrected voice period information acquired in the sequence of the aforementioned voice period integration correction process (FIG. 4) is stored in the moving image quick preview index storage module 11A as quick preview playback period information with a schema shown in, e.g., Table 5 below.

Table 5 exemplifies scene change detection results in this embodiment. For example, this table stores results obtained by converting frames that have scene change point detection into seconds on of a frame rate (30 frames/sec).

TABLE 5

| Scene Change ID | Start Time [msec] |
|---|---|
| 0 | 50000 |
| 1 | 70000 |
| 2 | 100000 |
| 3 | 101000 |
| 4 | 150000 |
| 5 | 300000 |
| 6 | 500000 |

Table 6 exemplifies voice period detection results in the second embodiment, and one voice period is expressed by the start and end points.

TABLE 3

| Utterance Period | Start Time [msec] | End Time [msec] |
|---|---|---|
| 0 | 60000 | 80000 |
| 1 | 102000 | 120000 |
| 2 | 400000 | 480000 |

Table 7 exemplifies the corrected voice period detection results in the second embodiment, i.e., the processing results when the voice period integration correction process (FIG. 4) is executed to have a threshold value Th4=2000 msec on the basis of the results shown in Tables 5 and 6.

TABLE 7

| Utterance Period | Start Time [msec] | End Time [msec] |
|---|---|---|
| 0 | 60000 | 80000 |
| 1 | 100666 | 120000 |
| 2 | 400000 | 480000 |

With reference to Tables 5 and 6, there is no scene change within the period of 2000 msec as the threshold value Th4 before the start points (60000 msec and 400000 msec) of voice periods 0 and 2. For voice period 1, there are two scene change points with scene change IDs=2 (start point 100000 msec) and 3 (start time 101000 msec) 1500 msec before its start point (102000 msec) and within the range of 2000 msec. In this case, since a scene change point closest to voice period 1 is selected according to the algorithm shown in FIG. 4, a scene change point with scene change ID=3 (101000 msec) is consequently selected, and is reflected in Table 7.

<Moving Image Quick Preview Playback Module 200>

In this embodiment, the moving image quick preview playback process (step S107) executed by the moving image quick preview playback module 200 is the same as that in the first embodiment, which has been explained previously with reference to FIGS. 5 to 10, and a description thereof will be omitted in this embodiment.

In the second embodiment described above, the number of zero cross points and voice energy are used in the voice labeling process. However, the practical processing sequence of that process is not always limited to the aforementioned algorithm. For example, known feature amounts may be used or other label determination algorithms may be used.

That is, the gist of the voice detection process according to this embodiment lies in that an audio signal that has undergone the low-pass filter process is segmented into a plurality of rational voice segments (voice periods) using zero cross point information of that audio signal. In this case, after the voice pitch is detected and voice labeling is done by the waveform process, the plurality of voice segments are integrated with reference to a predetermined voice pitch that always appears in vowels that make up the majority of a human voice using features of voice such as a CVC voice model and the like. In this way, even when any disturbance such as BGM or the like is contained in the audio signal, a process for recovering such disturbance can also be executed.

Therefore, the implementation methods of the AGC 21 and low-pass filter 22 are not particularly limited. Also, voice labeling need not always adopt the algorithm of this embodiment, and other label determination algorithms may be used.

In the determination process (FIG. 21) executed by the voice period determination module 28, the order of the process in step S1106 of obtaining a voice period by integrating an unvoiced consonant segment or voiced consonant segment and pitch segments, and the process in step S1107 of obtaining a voice period by integrating two pitch segments which neighbor or have a silence segment or noise segment between them is not limited to the aforementioned embodiment. For example, an algorithm which parallelly processes these steps may be adopted.

In the aforementioned embodiment, as a sequence upon selecting a user profile, the user designates a profile selection window using a remote controller terminal as needed, and selects his or her user profile from the user profile list displayed on the display 12. However, the present invention is not limited to such specific sequence. For example, a sequence that prevents the user profiles of other users from being altered or deleted using a password may be adopted.

Furthermore, an automatic profile selection method using a personal recognition technique by means of fingerprints, voiceprints, facial recognition, or the like is available. Such method is convenient since the need for preventing the user profiles of other users from being altered or deleted using a password can be obviated.

In the aforementioned embodiment, after the user has confirmed the calculated required quick preview playback time, if he or she is dissatisfied with the profile or default setups, he or she changes or adjusts the playback speeds of periods A and B so that the playback time can be equal to or shorter than his or her desired playback time. However, the present invention is not limited to such specific arrangement. For example, the following embodiment is available. That is, the user may be allowed to change the playback times of periods A and B respectively, while observing a playback video, and the required quick preview time corresponding to the changed setups may be re-calculated and may be presented to the user. In this way, the user may adjust the above parameters, so that the playback time becomes close to his or her desired time.

As described above, according to this embodiment, a human voice utterance mechanism is based on vocal-fold vibrations, i.e., so-called a voice pitch. By extracting the voice pitch from the audio signal, effective voice periods are obtained to detect true human voice periods. Using the detected periods, upon moving image quick preview playback, all periods that contain voice uttered by persons are played back at a speed at which the contents can be recognized, while periods (periods B) that do not contain any voice uttered by persons are played back at a higher speed, without disturbing synchronization between video and audio data. In this manner, the total browse time upon moving image quick preview playback can be efficiently reduced compared to normal-speed playback.

According to this embodiment, the playback speeds of periods A and B can be easily changed to those suited to each individual user using the user profile 14, and the tone volume upon playing back periods B can be set in correspondence with each user.

Furthermore, according to this embodiment, since the required quick preview playback time is displayed in advance or during playback of a moving image, the user who is dissatisfied with that time can adjust the displayed time to an optimal quick preview playback time to him or her by designating the playback speeds of periods A and B. Also, the information set by adjustment can be stored in the profile corresponding to that user to update old information. Hence, a moving image can be appropriately played back upon next quick preview playback.

Another Embodiment

The preferred embodiments of the present invention have been explained, and the present invention may be applied to either a system constituted by a plurality of devices, or an apparatus consisting of a single equipment.

Note that the present invention includes a case wherein the invention is achieved by directly or remotely supplying a software program that implements the functions of the aforementioned embodiments to a system or apparatus, which serves as the aforementioned moving image playback apparatus, and reading out and executing the supplied program code by a computer of that system or apparatus. In this case, the form is not limited to a program as long as it has functions of the program.

Therefore, the program code itself installed in a computer to implement the functional process of the present invention using the computer implements the present invention. That is, the appended claims of the present invention include the computer program itself for implementing the functional process of the present invention.

In this case, the form of program is not particularly limited, and an object code, a program to be executed by an interpreter, script data to be supplied to an OS, and the like may be used as long as they have the program function.

As a recording medium for supplying the program, for example, a floppy disk, hard disk, optical disk, magnetooptical disk, MO, CD-ROM, CD-R, CD-RW, magnetic tape, nonvolatile memory card, ROM, DVD (DVD-ROM, DVD-R) and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the appended claims of the present invention include a WWW (World Wide Web) server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

According to the embodiments mentioned above, the browse time required for the user can be greatly reduced while voice periods uttered by a person are accurately detected, and synchronization between video and audio data is faithfully maintained in accordance with the detected voice periods.

As many apparently widely different embodiments of the present invention can be made without departing from the spirit and scope thereof, it is to be understood that the invention is not limited to the specific embodiments thereof except as defined in the claims.

What is claimed is:

1. A moving image playback apparatus which enable to play back moving image information at a high speed, comprising:
   voice period determination means for determining a first voice period which represents a human utterance period, and a second voice period other than the first voice period, on the basis of an audio signal contained in the moving image information; and
   quick preview playback means for making high-speed moving image playback with playback voice of the first voice period at a predetermined speed at which a user can recognize playback contents, while making at least high-speed moving image playback of the second voice period at a speed higher than the predetermined speed,
   wherein upon reception of an instruction of execution of high-speed moving image playback by said quick preview playback means, said voice period determination means determines the first and second voice periods on the basis of the moving image information prior to output of a playback video, so as to execute determination of voice periods by said voice period determination means and high-speed moving image playback by said quick preview playback means in pseudo real time.

2. The apparatus according to claim 1, wherein said quick preview playback means makes moving image playback with at least playback voice in a tone volume of the second voice period that is smaller than the volume of the first voice period at the speed higher than the predetermined speed.

3. The apparatus according to claim 1, wherein said quick preview playback means makes silent moving image playback of the second voice period at the speed higher than the predetermined speed.

4. The apparatus according to claim 1, wherein a tone volume upon playing back voice in the second voice period in said quick preview playback means is determined in advance or can be designated by the user.

5. The apparatus according to claim 1, wherein said voice period determination means comprises correction means for making correction by integrating a plurality of neighboring first voice periods on a time axis upon determining the first voice period on the basis of the audio signal.

6. The apparatus according to claim 1, wherein said quick preview playback means calculates a time required for the high-speed moving image playback on the basis of a duration and playback speed of the first voice period, and a duration of the second voice period, and presents the calculated required time to the user.

7. The apparatus according to claim 6, wherein said quick preview playback means comprises adjustment means for, when the user changes playback speeds of the first and second voice periods after the required time is presented, adjusting the required time on the basis of the changed playback speeds.

8. The apparatus according to claim 1, wherein the predetermined speed upon making the high-speed moving image playback of the first voice period is 1.5 to 2 times of a normal playback speed.

9. The apparatus according to claim 1, wherein said voice period determination means extracts a voice pitch corresponding to a vocal-fold vibration on the basis of the audio signal, and determines the first voice period on the basis of the extracted voice pitch.

10. The apparatus according to claim 1, wherein a tone volume upon playing back voice in the second voice period in said quick preview playback means is determined in advance or can be designated by the user.

11. The apparatus according to claim 1, wherein said voice period determination means determines the first voice period by detecting dominant vowel parts of a human voice by extracting a pitch within a possible vocal-fold frequency range from a signal obtained by filtering a band of voice which is contained in the audio signal and is uttered by a person, and integrating the detected vowel parts.

12. A moving image playback method which enable to play back moving image information at a high speed, comprising:
  a voice period determination step of determining a first voice period which represents a human utterance period, and a second voice period other than the first voice period, on the basis of an audio signal contained in the moving image information; and
  a quick preview playback step of making high-speed moving image playback with playback voice of the first voice period at a predetermined speed at which a user can recognize playback contents, while making at least high-speed moving image playback of the second voice period at a speed higher than the predetermined speed,
  wherein upon execution of high-speed moving image playback in said quick preview playback step, determination of the first and second voice periods on the basis of the moving image information in said voice period determination step is executed prior to output of a playback video, so as to execute determination of voice periods in said voice period determination step and high-speed moving image playback in said quick preview playback step in pseudo real time.

13. The method according to claim 12, wherein, in said quick preview playback step, moving image playback with at least playback voice in a tone volume that is smaller than the volume of the first voice period is performed at the speed higher than the predetermined speed in the second voice period.

14. The method according to claim 12, wherein, in said quick preview playback step, moving image playback with no voice is performed at the speed higher than the predetermined speed in the second voice period.

15. The method according to claim 12, wherein, in said voice period determination step, a plurality of neighboring first voice periods on a time axis are corrected by integrating on the basis of the audio signal upon determining the first voice period.

16. The method according to claim 12, wherein said voice period determination step includes steps of:
  extracting a voice pitch corresponding to a vocal-fold vibration on the basis of the audio signal, and
  determining the first voice period on the basis of the extracted voice pitch.

17. The method according to claim 12, wherein said voice period determination step includes steps of:
  determining the first voice period by detecting dominant vowel parts of a human voice by extracting a pitch within a possible vocal-fold frequency range from a signal obtained by filtering a band of voice which is contained in the audio signal and is uttered by a person, and integrating the detected vowel parts.

18. A storage medium storing a computer program which issues an operation instruction that makes a computer implement a moving image playback apparatus that enable to play back moving image information at a high speed, comprising:
  a program code for a voice period determination function of determining a first voice period which represents a human utterance period, and a second voice period other than the first voice period, on the basis of an audio signal contained in the moving image information; and
  a program code for a quick preview playback function of making high-speed moving image playback with playback voice of the first voice period at a predetermined speed at which a user can recognize playback contents, while making at least high-speed moving image playback of the second voice period at a speed higher than the predetermined speed,
  wherein upon reception of an instruction of execution of high-speed moving image playback by said quick preview playback function, said voice period determination function determines the first and second voice periods on the basis of the moving image information prior to output of a playback video, so as to execute determination of voice periods by said voice period determination function and high-speed moving image playback by said quick preview playback function in pseudo real time.

* * * * *